US012166316B2

(12) United States Patent
Murakami et al.

(10) Patent No.: US 12,166,316 B2
(45) Date of Patent: Dec. 10, 2024

(54) LOW-HEIGHT CONNECTOR FOR HIGH-SPEED TRANSMISSION

(71) Applicant: Molex, LLC, Lisle, IL (US)

(72) Inventors: Kai Murakami, Yamato (JP); Kimiyasu Makino, Yamato (JP); Hidehiro Matsushita, Yamato (JP)

(73) Assignee: Molex, LLC, Lisle, IL (US)

( * ) Notice: Subject to any disclaimer, the term of this patent is extended or adjusted under 35 U.S.C. 154(b) by 192 days.

(21) Appl. No.: 17/673,827

(22) Filed: Feb. 17, 2022

(65) Prior Publication Data

US 2022/0263273 A1 Aug. 18, 2022

(30) Foreign Application Priority Data

Feb. 18, 2021 (JP) ................................ 2021-024342

(51) Int. Cl.

| | |
|---|---|
| ***H01R 13/6471*** | (2011.01) |
| ***H01R 12/71*** | (2011.01) |
| ***H01R 13/502*** | (2006.01) |
| ***H01R 13/629*** | (2006.01) |
| ***H01R 13/639*** | (2006.01) |

(52) U.S. Cl.

CPC ....... *H01R 13/6471* (2013.01); *H01R 12/716* (2013.01); *H01R 13/502* (2013.01); *H01R 13/629* (2013.01); *H01R 13/639* (2013.01)

(58) Field of Classification Search

CPC ...... H01R 12/716; H01R 12/91; H01R 12/75; H01R 13/629; H01R 13/639; H01R 13/6471; H01R 13/502

USPC .......................................................... 439/670

See application file for complete search history.

(56) References Cited

U.S. PATENT DOCUMENTS

| | | | | |
|---|---|---|---|---|
| 5,954,536 A * | 9/1999 | Fuerst | .................... | H01R 12/79 439/496 |
| 7,883,350 B2 * | 2/2011 | Byrnes | ............... | H01R 13/6273 439/157 |
| 8,512,058 B2 * | 8/2013 | Ozeki | .................... | H01R 12/79 439/260 |
| 2018/0294603 A1 * | 10/2018 | Nishi | ................... | H01R 13/631 |

(Continued)

FOREIGN PATENT DOCUMENTS

| | | |
|---|---|---|
| JP | S6269475 A | 3/1987 |
| JP | H0166776 U | 4/1989 |

(Continued)

*Primary Examiner* — Marcus E Harcum

(57) ABSTRACT

A connector includes a first connector including a first housing, a wire held by the first housing, and a first terminal held by the first housing, including the main body part connected to a conductive wire of the wire and a contact part extending in a first direction; and a second connector including a second housing and a second terminal held by the second housing, including a contact part extending in the first direction, which is mounted on the surface of the circuit board, where the first connector is moved in the first direction with respect to the second connector, and then moved in a second direction orthogonal to the first direction with respect to the second connector to be fitted to the second connector, and the contact part of the first terminal is brought into contact with the contact part of the second terminal, when the first connector is moved in the second direction with respect to the second connector.

18 Claims, 15 Drawing Sheets

(56) References Cited

U.S. PATENT DOCUMENTS

| | | | | |
|---|---|---|---|---|
| 2019/0190208 | A1* | 6/2019 | Muro ................. | H01R 13/6581 |
| 2023/0135482 | A1* | 5/2023 | Masunaga .......... | H01R 13/6582 439/607.01 |

FOREIGN PATENT DOCUMENTS

| | | | |
|---|---|---|---|
| JP | H0322363 | U | 3/1991 |
| JP | 2599329 | B2 | 4/1997 |
| JP | H09232020 | A | 9/1997 |
| JP | 2000315536 | A | 11/2000 |
| JP | 2017199527 | A | 11/2017 |
| JP | 2018045938 | A | 3/2018 |
| JP | 2019197685 | A | 11/2019 |

* cited by examiner

LOW-HEIGHT CONNECTOR FOR HIGH-SPEED TRANSMISSION

RELATED APPLICATIONS

This application claims priority to Japanese Patent Application No. 2021-024342 filed on Feb. 18, 2021, which is incorporated herein by reference in its entirety.

TECHNICAL FIELD

The present disclosure relates to a connector.

BACKGROUND ART

Conventionally, in wire-to-board connectors for connecting wires such as cables to boards such as printed circuit boards, for improving electromagnetic shielding (shield) characteristics for high-frequency signals, shells are attached to housings of wire connectors and housings of board connectors, and the shells are brought into contact with each other. Existing connectors have their drawbacks, and accordingly it is desirable to provide connectors that address the shortcomings of existing connectors.

SUMMARY

An object herein is to solve problems with the conventional wire-to-board connector and provide a connector that is capable of reliability maintaining the condition of a connector fitted and the condition of a terminal in contact, suitable for the transmission of high-speed signals, simple in structure, low in cost, small in size and height, and high in reliability.

For this purpose, a connector in accordance with one embodiment may include: a first connector including a first housing, a wire held by the first housing, and a first terminal held by the first housing, including the main body part connected to a conductive wire of the wire and a contact part extending in a first direction; and a second connector including a second housing and a second terminal held by the second housing, including a contact part extending in the first direction, which is mounted on the surface of the circuit board, where the first connector is moved in the first direction with respect to the second connector, and then moved in a second direction orthogonal to the first direction with respect to the second connector to be fitted to the second connector, and the contact part of the first terminal is brought into contact with the contact part of the second terminal, when the first connector is moved in the second direction with respect to the second connector.

In another connector in accordance with one embodiment, the contact part of the first terminal and the contact part of the second terminal extend straight in a first direction.

In still another connector in accordance with one embodiment, furthermore, when the first connector is moved in the first direction with respect to the second connector, the contact part of the first terminal and the contact part of the second terminal are not brought into contact with each other.

In still another connector in accordance with one embodiment, furthermore, the contact part of the second terminal includes a contact tip part formed at the tip of the contact part, and the contact tip part is curved to expand toward the contact part of the first terminal and brought into contact with the vicinity of the most distal end of the contact part of the first terminal.

In still another connector in accordance with one embodiment, furthermore, the second terminal includes a tail part connected to the circuit board, the main body part of the first terminal and the tail part of the second terminal extend in the second direction, and when the contact part of the first terminal and the contact part of the second terminal come into contact with each other, a transmission path connecting the first terminal and the second terminal take a substantially crank shape, that is a shape that is bent and at a right angle.

In still another connector in accordance with one embodiment, the first connector further includes a first shell that covers at least a part of the periphery of the first housing, the second connector further includes a second shell that covers at least a part of the periphery of the second housing, and an actuator rotatably attached to the second shell, and when the actuator is rotated, the first connector is moved in the second direction.

In still another connector in accordance with one embodiment, the first shell includes a front surface part that covers at least a part of the front surface of the first housing, the actuator includes a lock protrusion, and the lock protrusion pushes the front surface part to move the first connector in the second direction when the actuator is rotated, and is engaged in and locked to the front surface lock recess formed in the front surface part when the rotation of the actuator is completed.

According to the present disclosure, the condition of the connector fitted and the condition of the terminal in contact can be reliably maintained. In addition, the connector is suitable for the transmission of high-speed signals, the structure can be simplified, the cost can be reduced, and the reliability is improved.

DETAILED DESCRIPTION OF THE PREFERRED EMBODIMENT

Hereinafter, an embodiment will be described in detail with reference to the drawings.

Figure 1:
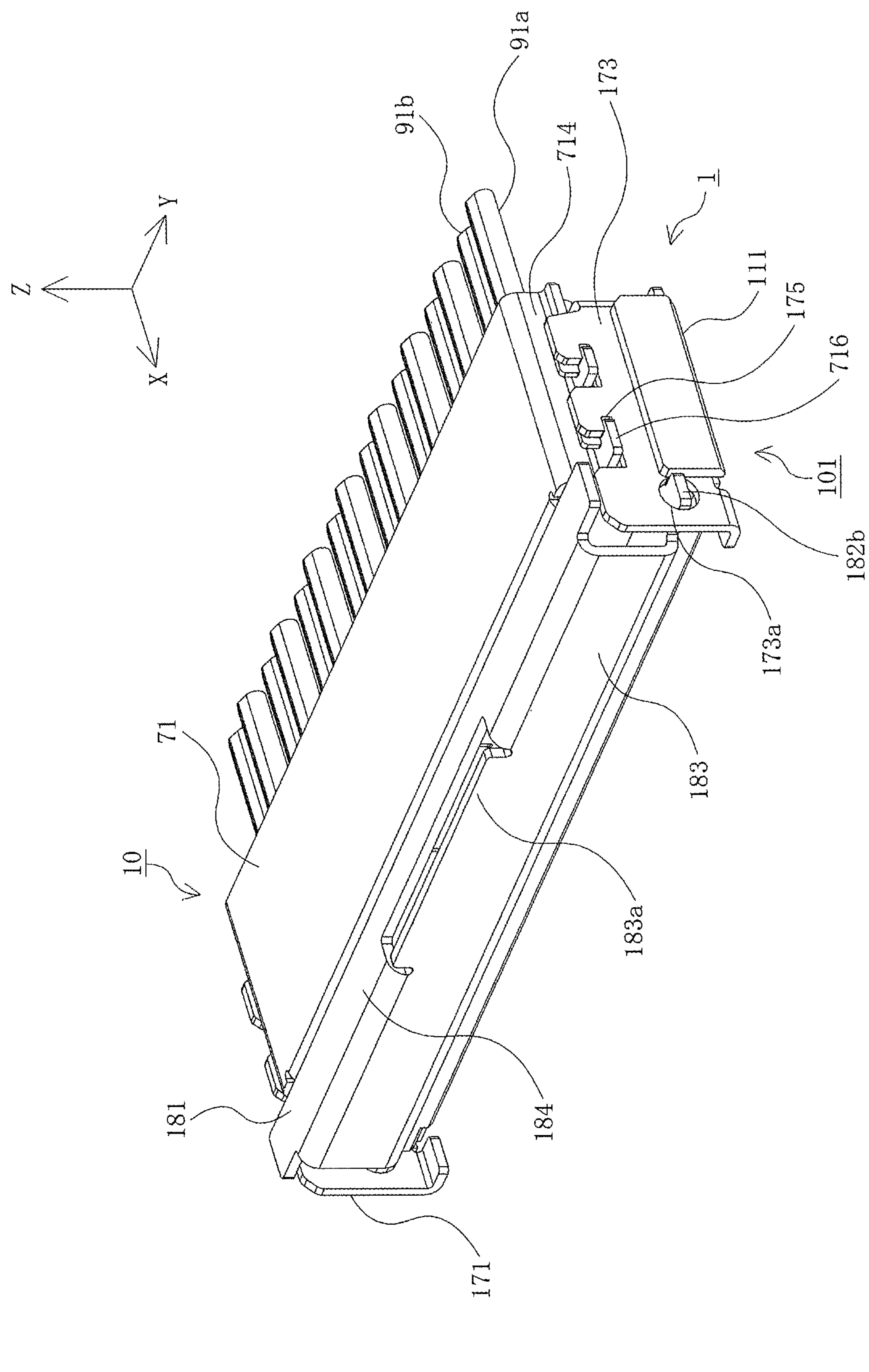
FIG. 1 is a perspective view illustrating a first connector and a second connector fitted to each other according to the present embodiment.
Figure 2:
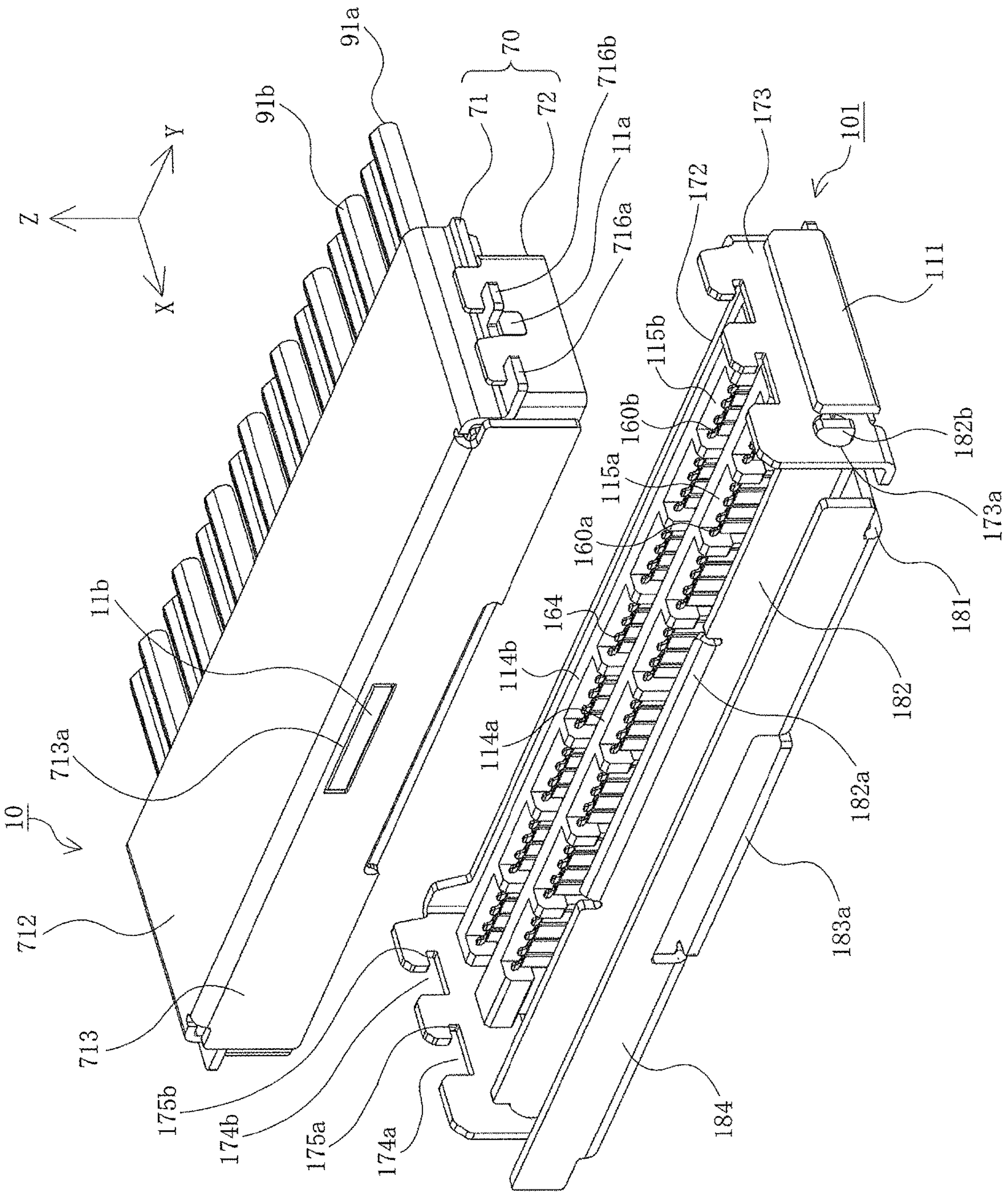
FIG. 2 is a perspective view illustrating the first and second connectors according to the present embodiment before fitting the connectors to each other.
Figure 3:
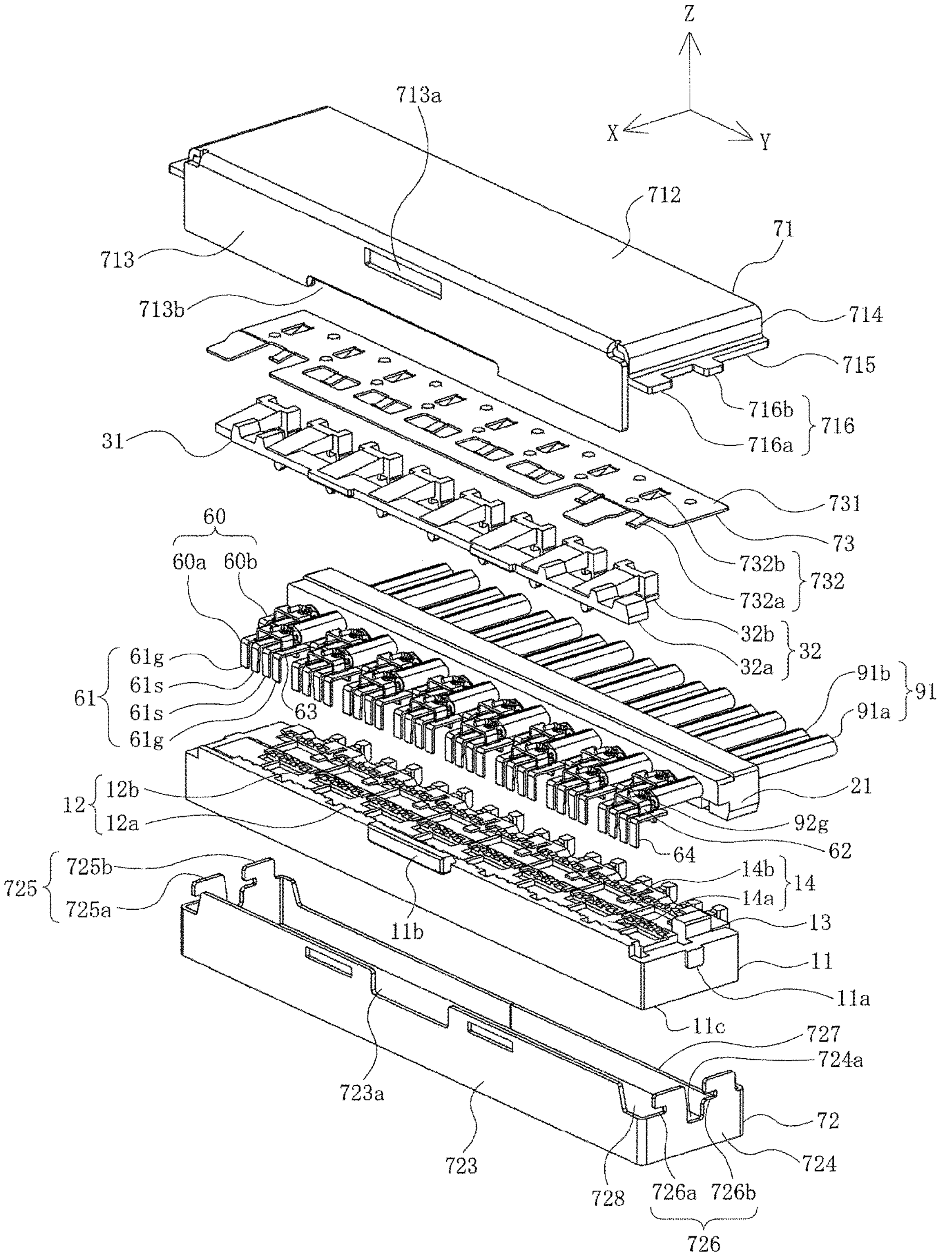
FIG. 3 is an exploded view of the first connector according to the present embodiment.
Figure 4:
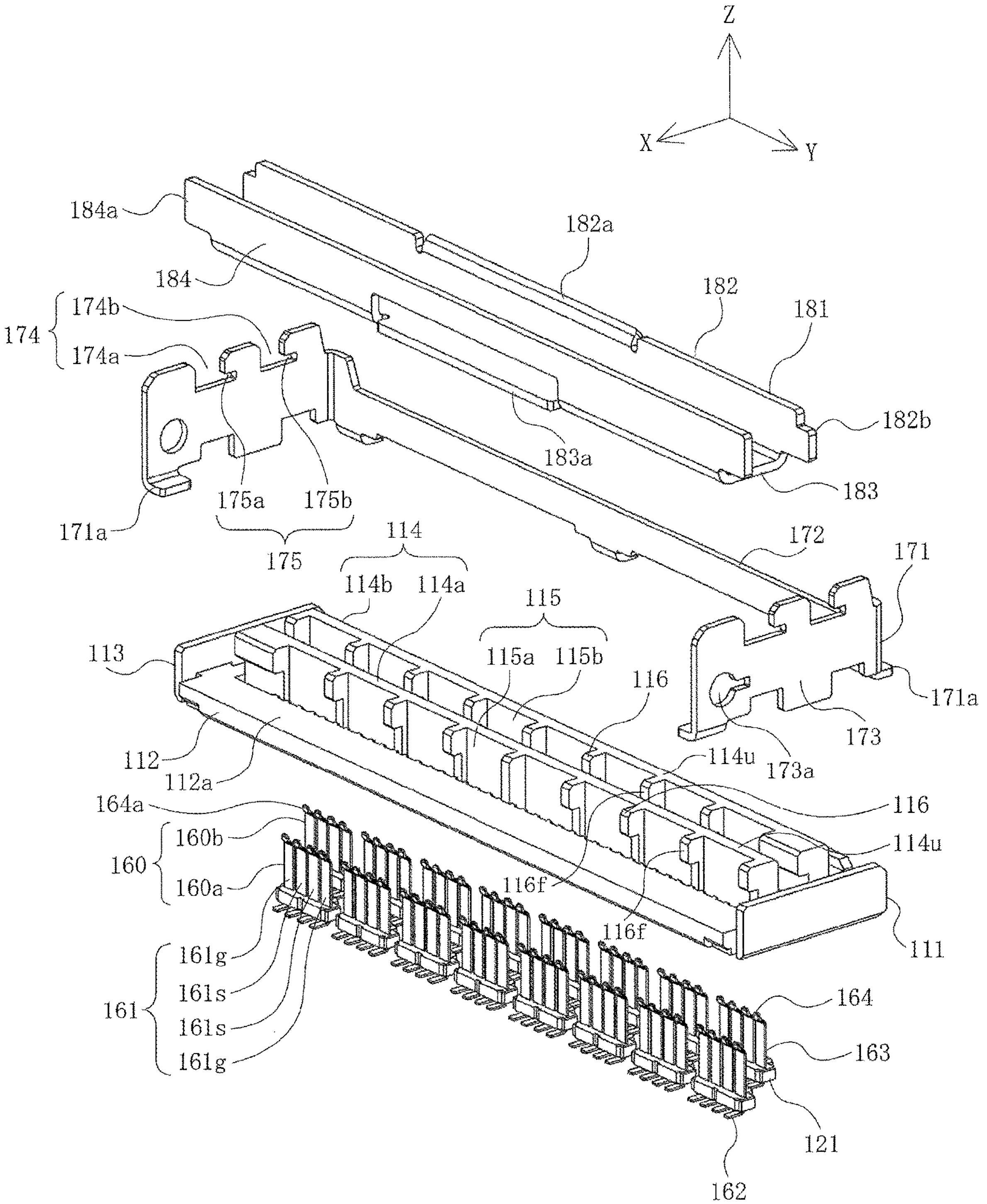
FIG. 4 is an exploded view of the second connector according to the present embodiment.
Figure 5:
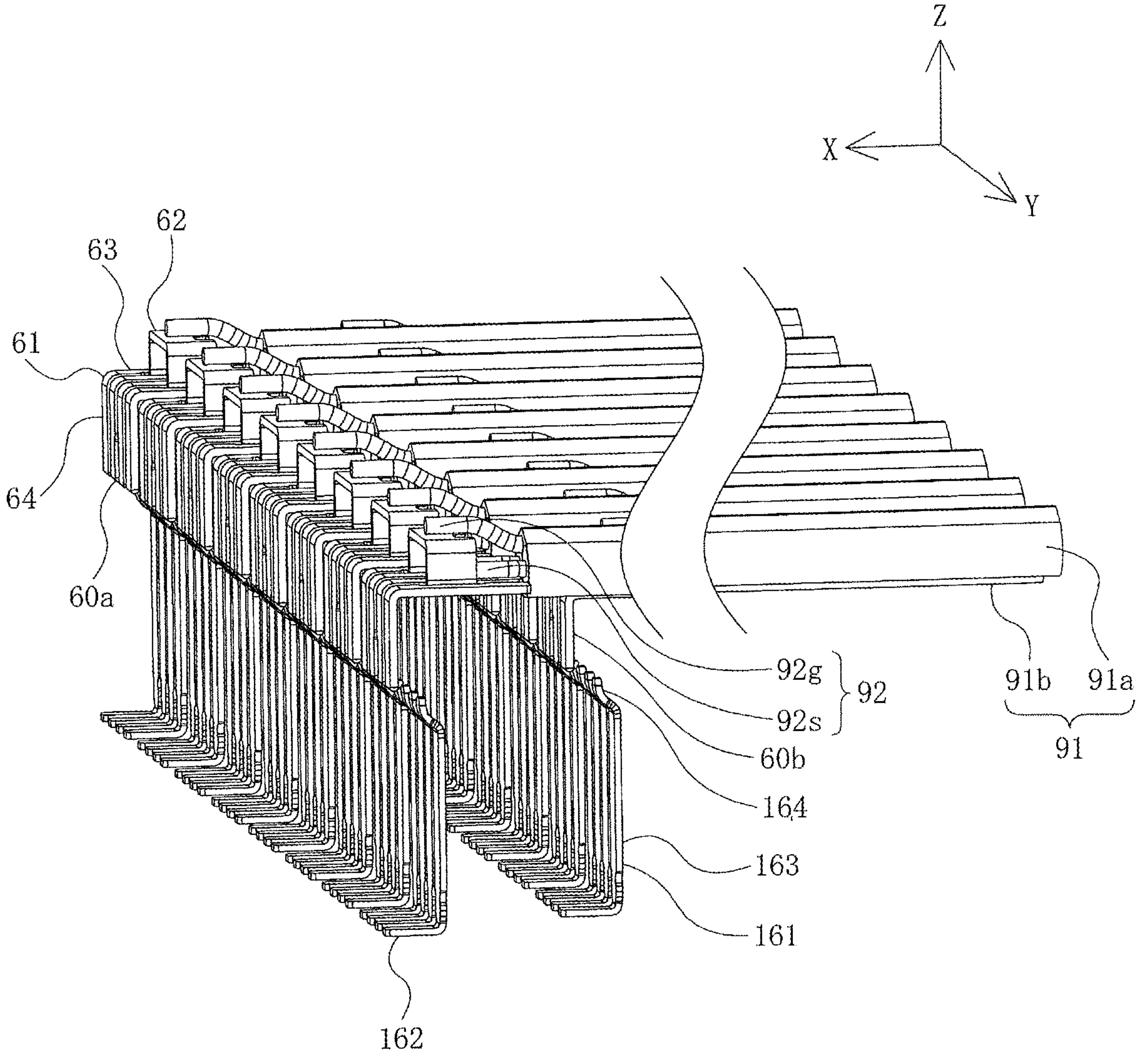
FIG. 5 is a perspective view illustrating the first and second terminals according to one embodiment immediately before bringing the terminals into contact with each other.

FIG. 1 is a perspective view illustrating a first connector and a second connector fitted to each other according to the present embodiment, FIG. 2 is a perspective view illustrating the first and second connectors according to the present embodiment before fitting the connectors to each other, FIG. 3 is an exploded view of the first connector according to the present embodiment, FIG. 4 is an exploded view of the second connector according to the present embodiment, and FIG. 5 is a perspective view illustrating a first terminal and a second terminal according to the present embodiment immediately before bringing the terminals into contact with each other.

In FIG. 1, reference numeral 10 denotes a first connector, or a so-called wire connector, as one connector of a wire-to-board connector assembly 1, which is a connector according to the present embodiment, which is intended to be connected to a terminal end of a cable including a plurality of wires 91 and used to electrically connect the cable to the circuit board via the second connector 101. In addition, reference numeral 101 denotes a second connector, or a so-called board connector, as the other of the wire-to-board connector assembly 1, and the connector is intended to be surface-mounted on a circuit board, not shown, and used to electrically connect the cable to the circuit board via the second connector 101. It is to be noted that the circuit board is a printed circuit board for use in an electronic device or the like, but may be a flexible flat cable (FFC), a flexible circuit board (FPC), or the like, and may be any type of circuit board.

In addition, the wire-to-board connector assembly 1 is desirably a low-profile connector with a dimension of 5 mm or less in the height direction (Z-axis direction), and is suitable for ultra-high speed signal transmission of, for example, about 112 Gbps, but is not considered to be necessarily limited thereto. The wire-to-board connector 1 will be described here as a cable leveling type which draws the wires 91 out in a direction parallel with the surface of the circuit board, and which employs a so-called horizontal slide fitting method in which the first connector 10 is fitted to the second connector 101 in the vertical direction (vertical direction: Z-axis direction) as a first direction and then slid in the horizontal direction (front-rear direction: X-axis direction) as a second direction to complete the fitting.

It is to be noted that, in the present embodiment, expressions that indicate directions such as up, down, left, right, front, and back for use in describing the configuration and operation of each part of the first connector 10 and the second connector 101 are not absolute but relative, and are appropriate in the case where the first connector 10 and the second connector 101 have the positions illustrated in the drawings, and in the case where the positions of the first connector 10 and second connector 101 are changed, the expressions should be interpreted in a modified manner depending on the change in posture.

In the present embodiment, the first connector 10, integrally molded from an insulating material such as a synthetic resin, includes a wire-side housing 11 as a first housing to be fitted to a board-side housing 111 of the second connector 101, a wire-side terminal 61 as a metallic first terminal held by the wire-side housing 11 and connected to the front end of the wire 91 so as to provide conduction to a conductive wire 92 as a core wire of the wire 91 also held by the wire-side housing 11, and a first shell 70 made of a conductive metal plate attached to the wire-side housing 11 so as to cover at least a part of the periphery of the wire-side housing 11.

In the example illustrated at FIG. 5, the conductive wire 92 of each wire 91 includes two signal lines 92*s* for transmitting signals and one grounded line 92*g* that functions as a ground line. In addition, each wire-side terminal 61, which is a member formed by bending an elongated strip-shaped conductive metal plate into a substantially dogleg shape, which includes a series of opposing turns or bends, preferably at substantially right angles, as viewed from a side surface of the metal plate (as viewed in the Y-axis direction). Each wire-side terminal 61 also includes a main body part 63 as a connecting part extending substantially parallel to the wire 91 and a contact part 64 extending straight downward (in the negative Z-axis direction) from the front end (the end in the positive X-axis direction) of the main body part 63. Further, four wire-side terminals 61 are allocated for each wire 91, and the four wire-side terminals 61 constitute a wire-side terminal group 60 as one first terminal group. More specifically, with reference to FIG. 3, one wire-side terminal group 60 is connected to the terminal end of each wire 91, and the four wire-side terminals 61 are arranged in parallel in each wire-side terminal group 60. In this regard, the two wire-side terminals 61 closer to the center function respectively as signal terminals 61*s* connected to the respective signal lines 92*s*, whereas the two wire-side terminals 61 closer to the outside function as grounded terminals 61*g* connected to the grounded line 92*g*. As described above, the grounded terminals 61*g* are disposed on both sides of the pair of signal terminals 61*s*, and the signals transmitted by the signal terminal 61*s* in each wire-side terminal group 60 are thus electromagnetically shielded, and hardly affected by the signals or noises transmitted by the signal terminals 61*s* in the adjacent wire-side terminal group 60.

It is to be noted that the grounded line 92*g* and the grounded terminals 61*g* are connected via a ground connecting member 62 formed by bending a conductive metal plate into a substantially U-shape, and specifically, the terminal end of the grounded line 92*g* is connected to a central upper end of the ground connecting member 62 by a connecting means such as soldering, whereas the main body part 63 of each grounded terminal 61*g* is connected to both lower ends of the ground connecting member 62 by a connecting means such as soldering.

In addition, the wire-side terminal groups 60 are arranged side by side so as to form two rows extending in the width direction (Y-axis direction) of the first connector 10. In this regard, the wire-side terminal group 60 that forms the row on the front (positive X-axis direction) side of the first connector 10 will be referred to as a front wire-side terminal group 60*a*, whereas the wire-side terminal group 60 that forms the row on the rear (negative X-axis direction) side of the first connector 10 will be referred to as a rear wire-side terminal group 60*b*. In the example illustrated in FIG. 3, the numbers of front wire-side terminal groups 60*a* and of rear wire-side terminal groups 60*b* are each eight. In addition, the wire 91 connected to the wire-side terminal 61 of the front wire-side terminal group 60*a* is referred to as a front wire 91*a*, whereas the wire 91 connected to the wire-side terminal 61 of the rear wire-side terminal group 60*b* is referred to as a rear wire 91*b*.

Further, the rear wire-side terminal group 60*b* is located slightly lower than the front wire-side terminal group 60*a* in the height direction, and is located between the front wires 91*a* corresponding to the adjacent front wire-side terminal group 60*a* in the width direction of the first connector 10. Thus, in plan view, that is, as viewed from above (as viewed in the Z-axis direction), the wire-side terminal groups 60 can be densely disposed, and the dimension of the first connector 10 in the width direction can be reduced. It is to be noted that at all of the wire-side terminals 61 of all of the front wire-side terminal groups 60*a*, the main body parts 63 are arranged so as to be located in the same horizontal plane (X-Y plane), whereas the contact parts 64 are arranged so as to be located in the same vertical plane (Y-Z plane), and at all of the wire-side terminals 61 of all of the rear wire-side terminal groups 60*b*, the main body parts 63 are arranged so as to be located in the same horizontal plane, whereas the contact parts 64 are arranged so as to be located in the same vertical plane.

In addition, the contact part 64 of the wire-side terminal 61 of the front wire-side terminal group 60*a* is longer than the contact part 64 of the wire-side terminal 61 of the rear wire-side terminal group 60*b*, and the lower end (tip) of the contact part 64 of the wire-side terminal 61 of the front wire-side terminal group 60*a* and the lower end of the contact part 64 of the wire-side terminal 61 of the rear wire-side terminal group 60*b* are set to be located at the same position in the height direction.

Furthermore, the rear wire 91*b* is located slightly lower than the front wire 91*a* in the height direction, and is located between the adjacent front wires 91*a* in the width direction of the first connector 10. Thus, in plan view, the wires 91 can be densely disposed, and the dimension of the cable in the width direction can be reduced.

It is to be noted that the wires 91 are held by a wire holding member 21 integrally molded from an insulating material such as synthetic resin in the vicinity of the sites connected to the wire-side terminals 61. The wire holding member 21, which is an elongated rod-shaped member extending in the width direction of the first connector 10, is molded by insert molding to be integrated with each wire 91 in a manner that covers the outer periphery of each wire 91. Thus, the front wire 91*a* and the rear wire 91*b* can maintain the above-described arrangement, and the front wire-side terminal group 60*a* and the rear wire-side terminal group 60*b* connected to the front wire 91*a* and the rear wire 91*b* can also maintain the above-described arrangement.

In addition, a pressing member 31 integrally molded from an insulating material such as a synthetic resin is disposed on the wire 91 and the wire-side terminal group 60 protruded forward from the wire holding member 21, and a potential equalization member 73 formed by processing, such as punching or bending, a conductive metal plate is further disposed on the pressing member 31.

Further, the pressing member 31, which is an elongated member extending in the width direction of the first connector 10, includes a terminal contact part 32 that presses the main body part 63 downward in contact with the upper surface of the main body part 63 of each wire-side terminal 61. It is to be noted that the terminal contact part 32 that presses the main body part 63 of the wire-side terminal 61 of the front wire-side terminal group 60*a* will be referred to as a front terminal contact part 32*a*, whereas the terminal contact part 32 that presses the main body part 63 of the wire-side terminal 61 of the rear wire-side terminal group 60*b* will be referred to as a rear terminal contact part 32*b*.

In addition, the potential equalization member 73 includes an elongated substantially rectangular main body part 731 extending in the width direction of the first connector 10, and a contact piece 732 with a tip directed obliquely downward, which is an elongated cantilevered member formed by cutting and raising a part of the main body part 731. More than one contact piece 732 is formed such that each tip is brought into contact with the upper end of the grounded line 92*g* connected to the ground connecting member 62 of each wire terminal group 60. Each contact piece 732 functions as a cantilevered spring, and the tip thereof is pressed by the spring force exerted by itself against the upper end of the grounded line 92*g*, thus reliably maintaining the contact with the grounded line 92*g*. Thus, the grounded lines 92*g* of all of the wires 91 and all of the grounded terminals 61*g* connected to the grounded lines 92*g* via the ground connecting member 62 become equipotential via the potential equalization member 73. It is to be noted that the contact piece 732 in contact with the grounded line 92*g* of the front wire-side terminal group 60*a* will be referred to as a front contact piece 732*a*, whereas the contact piece 732 in contact with the grounded line 92*g* of the rear wire-side terminal group 60*b* will be referred to as a rear contact piece 732*b*.

Further, the wire-side housing 11 is an elongated substantially rectangular parallelepiped member extending in the width direction of the first connector 10, and a plurality of terminal group placement parts 14 on which the respective wire-side terminal groups 60 are placed are formed on the upper surface of the wire-side housing 11. The wire-side terminal group 60 is placed on the terminal group placement part 14 such that the lower surface of the main body part 63 of the wire-side terminal 61 is brought into contact with the upper surface of the terminal group placement part 14. In addition, the front end of each terminal group placement part 14 has a terminal housing groove 12 formed, into which the contact part 64 of each wire-side terminal 61 is inserted. Furthermore, a fitting recess 15 described later, which is open to the lower surface 11*c* and recessed upward from the lower surface 11*c* (in the positive Z-axis direction), is formed inside of the wire-side housing 11. Further, the terminal housing groove 12 is formed so as to reach, from the front end of the terminal group placement part 14, a part of a front inner wall surface 15*f* of the fitting recess 15 corresponding to the terminal group placement part 14 in the vicinity of the connection to a ceiling surface 15*u*.

It is to be noted that the terminal group placement parts 14 are arranged side by side so as to correspond to the arrangement of the wire-side terminal groups 60, that is, so as to form two rows extending in the width direction of the first connector 10. In this regard, the terminal group placement part 14 on which the front wire-side terminal group 60*a* is placed will be referred to as a front terminal group placement part 14*a*, whereas the terminal group placement part 14 on which the rear wire-side terminal group 60*b* is placed will be referred to as a rear terminal group placement part 14*b*. In addition, the terminal housing groove 12 formed at the front end of the front terminal group placement part 14*a* will be referred to as a front terminal housing groove 12*a*, whereas the terminal housing groove 12 formed at the front end of the rear terminal group placement part 14*b* will be referred to as a rear terminal housing groove 12*b*.

Furthermore, the fitting recesses 15 are also formed below the respectively corresponding terminal group placement parts 14. Thus, the fitting recess 15 formed below the front terminal group placement part 14*a* will be referred to as a front fitting recess 15*a*, whereas the fitting recess 15 formed below the rear terminal group placement part 14*b* will be referred to as a rear fitting recess 15*b*. It is to be noted that the front fitting recess 15*a* and the rear fitting recess 15*b* are separated from each other and formed independently of each other. The front fitting recesses 15*a* are, however, desirably arranged side by side in the width direction of the first connector 10, and adjacent to each other to be communicated with each other. Similarly, the rear fitting recesses 15*b* are also desirably arranged side by side in the width direction of the first connector 10, and adjacent to each other to be communicated with each other.

In addition, a rear end edge of the upper surface of the wire-side housing 11 functions as a holding member attachment part 13 to which the wire holding member 21 is attached. Furthermore, a side surface engagement protrusion 11*a* protruded outward is formed at the center of the upper end at both side surfaces of the wire-side housing 11 in the width direction, and a front surface engagement protrusion 11*b* protruded outward is formed at the center of the upper end at the front surface of the wire-side housing 11.

It is to be noted that in the example illustrated in the drawings, the wire-side housing 11, the wire holding member 21, and the pressing member 31 serve as separate members separated from each other, but all of the three members of: the wire-side housing 11; the wire holding member 21; and the pressing member 31 or any two members thereof may be integrally molded, if necessary.

Further, the first shell 70 includes a first lower shell 72 that covers front, rear, left, and right side surfaces of the wire-side housing 11, and a first upper shell 71 attached to the first lower shell 72 to cover the upper side of the wire-side housing 11.

The first lower shell 72, which is an elongated substantially quadrangular cylindrical member formed by processing, such as punching or bending, a conductive metal plate, includes a front surface part 723 attached to the front surface of the wire-side housing 11, side surface parts 724 attached to both side surfaces of the wire-side housing 11 in the width direction, a rear surface part 727 attached to the rear surface of the wire-side housing 11, and a housing space 728 that is a space with a periphery defined by the front surface part 723, the side surface part 724, and the rear surface part 727 to house the wire-side housing 11 therein.

Further, a side surface engagement recess 724*a* with an upper end open at the center is formed at the upper end edge of each side surface part 724, and locked pieces 725 extending upward are formed on both sides of the side surface engagement recess 724*a*. In addition, a locking recess 726 recessed rearward is formed at the front end of each locked piece 725. It is to be noted that the side surface engagement protrusion 11*a* of the wire-side housing 11 housed in the housing space 728 is housed and engaged in the side surface engagement recess 724*a*. In addition, a locked piece 716 of the first upper shell 71 is inserted into and locked to the locking recess 726. In this regard, the locked piece 725 formed closer to the front surface part 723 will be referred to as a front locked piece 725*a*, the locked piece 725 formed closer to the rear surface part 727 will be referred to as a rear locked piece 725*b*, the locking recess 726 formed in the front locked piece 725*a* will be referred to as a front locking recess 726*a*, and the locking recess 726 formed in the rear locked piece 725*b* will be referred to as a rear locking recess 726*b*.

In addition, a front surface engagement recess 723*a* with an upper end open at the center is formed at the upper end edge of the front surface part 723. It is to be noted that the front surface engagement protrusion 11*b* of the wire-side housing 11 housed in the housing space 728 is housed and engaged in the front surface engagement recess 723*a*.

The first upper shell 71, which is a member formed by processing, such as punching or bending, a conductive metal plate, includes a top surface part 712 that covers the upper side of the wire-side housing 11, a front surface part 713 that extends downward from the front end of the top surface part 712 and covers at least a part of the front side of the wire-side housing 11, side surface parts 714 that extend downward from both side ends of the top surface part 712 in the width direction and cover the vicinities of the upper ends of the side surfaces of the wire-side housing 11, and eaves parts 715 that extend horizontally from the lower ends of the side surface parts 714.

Further, the upper surface of the main body part 731 of the potential equalization member 73 is connected to the lower surface of the top surface part 712 by a connecting means such as soldering. Thus, the ungrounded lines 92*g* of all of the wires 91 and the grounded terminals 61*g* become equipotential via the potential equalization member 73 to the first upper shell 71 and the first lower shell 72 to which the first upper shell 71 is attached. In addition, a front surface engagement opening 713*a* that penetrates the front surface part 713 in the plate thickness direction is formed at the center near the upper end edge of the front surface part 713, and a front surface lock recess 713*b* with a lower end open is formed at the center of the lower end edge of the front surface part 713. Further, the front surface engagement protrusion 11*b* of the wire-side housing 11 is housed and engaged in the front surface engagement opening 713*a*, in addition, a lock protrusion 182*a* of an actuator 181 of the second connector 101 is accommodated and engaged in the front surface lock recess 713*b*, and as a result, the actuator 181 is locked. Furthermore, the locked piece 716 extending horizontally is formed at the outer end edge of the eaves part 715. The locked piece 716 is, as described above, inserted into and locked to the locking recess 726 of the first lower shell 72. In this regard, the locked piece 716 locked to the front locking recess 726*a* will be referred to as a front locked piece 716*a*, and the locked piece 716 locked to the rear locking recess 726*b* will be referred to as a rear locked piece 716*b*.

In the present embodiment, the second connector 101, integrally molded from an insulating material such as a synthetic resin, includes the board-side housing 111 as a second housing fitted to the wire-side housing 11 of the first connector 10, a board-side terminal 161 as a metallic second terminal held by the board-side housing 111 and connected to provide conduction to each of conductive pads formed on the surface of the circuit board, not shown, which are connected to the conductive wire of the circuit board, a second shell 171 made of a conductive metal plate, attached to the board-side housing 111 so as to cover at least a part of the periphery of the board-side housing 111, and the actuator 181 made of a conductive metal plate rotatably attached to the second shell 171.

Each board-side terminal 161, which is a member formed by bending an elongated strip-shaped conductive metal plate into a substantially dogleg shape as viewed from the side surface of the metal plate (as viewed in the Y-axis direction), includes a tail part 162 extending in the front-rear direction (X-axis direction) substantially parallel to the surface of the circuit board, and a contact part 163 extending straight line upward (in the positive Z-axis direction) from the rear end (the end in the negative X-axis direction) of the tail part 162. It is to be noted that the contact part 163 includes a contact tip part 164 formed at the tip, that is, upper end of the contact part 163. In addition, the front surface of the contact tip part 164 functions as a contact surface 164*a* that is brought into contact with the wire-side terminal 61. Further, all of the board-side terminals 161 are set to have the same dimensions.

In addition, the contact tip part 164 is curved so as to draw an arc expanded toward the front of the second connector 101 (in the positive X axis direction) as viewed from the side surface, and the tangent plane at the uppermost end of the arc-shaped contact surface 164*a* substantially coincides with the vertical plane in the initial state. Furthermore, the board-side terminal 161 includes no guiding part for smoothly guiding the wire-side terminal 61 in any part such as the contact tip part 164. This is because the wire-to-board connector 1 employs a so-called horizontal slide fitting method in which the first connector 10 is vertically fitted to the second connector 101 ad then slid horizontally to complete the fitting. More specifically, this is because the wire-side terminal 61 and the board-side terminal 161 are adapted not to come into contact with each other in the case of moving and then fitting the first connector 10 and the second connector 101 in a relatively vertical manner, and thereafter, come into contact with each other when the first connector 10 and the second connector 101 are slid in a relatively horizontal manner. Thus, it is not necessary to bring the contact part 64 of the wire-side terminal 61 into contact with the contact tip part 164 of the board-side terminal 161 while moving the contact part 64 relatively downward from above with respect to the contact tip part 164 and sliding the contact portion vertically, and thus, the contact part 163 extending upward and the contact tip part 164 connected to the upper end of the contact part 163 will not come into contact with the contact part 64 of the wire-side terminal 61 moving downward from above. Accordingly, it is not necessary to form any guiding part inclined so as to stay away from the vertical surface as the contact surface 164*a* goes upward and then smoothly slide and contact the contact part 64 of the wire-side terminal 61 and the contact tip part 164 of the board-side terminal 161 for preventing buckling, damage, and the like of the contact part 163. As a result, the impedance of the transmission path from the wire-side terminal 61 to the board-side terminal 161 is stabilized, because there is almost no redundant part such as a guiding part, which can serve as a stub, above the uppermost end of the contact tip part 164 of the board-side terminal 161 in contact with the contact part 64 of the wire-side terminal 61.

Further, the board-side terminal 161 is a member that comes into contact with the corresponding wire-side terminal 61 of the first connector 10 when the first connector 10 and the second connector 101 are fitted to each other, and thus, similarly to the wire-side terminal 61, the four board-side terminals 161 constitute a board-side terminal group 160 as one second terminal group, and the four board-side terminals 161 are arranged in parallel in each board-side terminal group 160. In addition, similarly to the wire-side terminals 61, in each board-side terminal groups 160, the two board-side terminals 161 closer to the center function respectively as signal terminals 161*s* connected to the conductive pads connected to signal lines of the circuit board, not shown, whereas the two board-side terminals 161 closer to the outside function respectively as grounded terminals 161*g* connected to the conductive pads connected to grounded lines of the circuit board, not shown. It is to be noted that the tail part 162 of each board-side terminal 161 is connected to the conductive pad of the circuit board by a connecting means such as soldering.

Furthermore, the arrangement of the board-side terminal groups 160 in plan view is similar to that of the wire-side terminal groups 60, and the board-side terminal groups 160 are arranged side by side so as to form two rows extending in the width direction (Y-axis direction) of the second connector 101. In this regard, the board-side terminal group 160 that forms the row on the front side of the second connector 101 will be referred to as a front board-side terminal group 160*a*, whereas the board-side terminal group 160 that forms the row on the rear (negative X-axis direction) side of the second connector 101 will be referred to as a rear board-side terminal group 160*b*. In the example illustrated in FIG. 4, the numbers of front board-side terminal groups 160*a* and of rear board-side terminal groups 160*b* are each eight.

The rear board-side terminal group 160*b* is located at the same position as the front board-side terminal group 160*a* in the height direction, but is located between the adjacent front board-side terminal groups 160*a* in the width direction of the second connector 101. Thus, in plan view, the board-side terminal groups 160 can be densely disposed, and the dimension of the second connector 101 in the width direction can be reduced.

It is to be noted that in the vicinity of the lower ends of the contact parts 163, the board-side terminals 161 are held by a terminal holding member 121 integrally formed from an insulating material such as synthetic resin, and collected for each board-side terminal group 160. The terminal holding member 121, which is an elongated rod-shaped member extending in the width direction of the second connector 101, is molded by insert molding to be integrated with the four board-side terminals 161 in a manner that covers the outer periphery near the lower ends of the contact parts 163 of the four board-side terminals 161.

Further, the board-side housing 111 includes an elongated plate-shaped bottom plate part 112 extending in the width direction of the second connector 101, and side plate parts 113 connected to both sides of the bottom plate part 112 in the width direction. The side plate part 113 is formed so as to protrude upward from the upper surface 112*a* of the bottom plate part 112.

In addition, the bottom plate part 112 has two partition walls 114 formed to extend vertically upward from the upper surface 112*a* and extend in the width direction in parallel with each other. In this regard, the partition wall 114 on the front side of the second connector 101 will be referred to as a front partition wall 114*a*, and the partition wall 114 on the rear side of the second connector 101 will be referred to as a rear partition wall 114*b*. Further, the front surface of each partition wall 114 has a plurality of partition ribs 116 formed to protrude forward and extend in the vertical direction. It is to be noted that the front side surface of the partition rib 116 is referred to as a front end surface 116*f*. Further, in front of each partition wall 114, the section defined by the partition ribs 116 that are adjacent in the width direction is a terminal housing section 115 in which the contact part 163 and contact tip part 164 of the board-side terminal 161 in each board-side terminal group 160 are housed. The terminal housing section 115 is formed so as to penetrate the bottom plate part 112 from the upper end of the partition wall 114 and reach the lower surface of the bottom plate part 112. Each board-side terminal group 160 is inserted into and attached to the corresponding terminal housing section 115 from below the bottom plate part 112, thereby housing the contact part 163 and contact tip part 164 of the board-side terminal 161 in the terminal housing section 115, causing the terminal holding member 121 to close the terminal housing section 115 that is open to the lower surface of the bottom plate part 112, and exposing the tail part 162 of the board-side terminal 161 below the bottom plate part 112. In addition, the upper end of the contact tip part 164 is positioned below the upper end surface 114*u* of the partition wall 114. The upper end surface 114*u*, which is a surface in contact with the ceiling surface 15*u* of the fitting recess 15 of the wire-side housing 11 with the first connector 10 and the second connector 101 vertically fitted, functions as a reference surface that defines, together with the ceiling surface 15*u*, the positional relationship between the board-side housing 111 and the wire-side housing 11 and the positional relationship between the board-side terminal 161 and the wire-side terminal 61 corresponding to each other in the vertical direction.

It is to be noted that the terminal housing sections 115 are arranged side by side so as to correspond to the arrangement of the board-side terminal groups 160, that is, so as to form two rows extending in the width direction of the second connector 101. In this regard, the terminal housing section 115 in front of the front partition wall 114*a* will be referred to as a front terminal housing section 115*a*, and the terminal housing section 115 in front of the rear partition wall 114*b* will be referred to as a rear terminal housing section 115*b*.

In addition, in the example illustrated in the drawings, the board-side housing 111 and the terminal holding member 121 serve as separate members separated from each other, but the board-side housing 111 and the terminal holding member 121 may be integrally molded, if necessary.

The second shell 171, which is a member formed by processing, such as punching or bending, a conductive metal plate, includes an elongated strip-shaped rear surface part 172 attached to the rear surface side of the board-side housing 111, and side surface parts 173 formed to extend forward from both ends of the rear surface part 172 and attached to inner surfaces of the side plate parts 113 on both sides of the board-side housing 111 in the width direction. It is to be noted that several tail parts 171*a* are formed at appropriate positions of the lower ends of the rear surface part 172 and side surface parts 173.

Further, a side surface engagement recess 174 with an upper end open at the center is formed at the upper end edge of each side surface part 173, and locking recesses 175 recessed rearward are formed on rear edges of the side surface engagement recess 174. Further, the locked piece 716 of the first upper shell 71 of the first connector 10 is housed and engaged in the side surface engagement recesses 174, and the locked piece 716 of the first upper shell 71 is inserted and locked in the locking recesses 175. When the locked piece 716 is inserted into the locking recess 175 and locked therein, the locking recess 175 and the locked piece 716 come into contact with each other. Thus, the grounded line 92*g* of the wire 91 and the grounded terminal 61*g* become equipotential to the first upper shell 71, the first lower shell 72, and the second shell 171. In this regard, the side surface engagement recesses 174 formed closer to the front will be referred to as a front side surface engagement recesses 174*a*, the side surface engagement recesses 174 formed closer to the rear will be referred to as a rear side surface engagement recesses 174*b*, the locking recess 175 formed in the front side surface engagement recess 174*a* will be referred to as a front locking recess 175*a*, and the locking recess 175 formed in the rear side surface engagement recess 174*b* will be referred to as a rear locking recess 175*b*.

In addition, a rotational shaft support hole 173*a* that penetrates in the plate thickness direction is formed near the front end of each side surface part 173. In the rotational shaft support holes 173*a*, rotational pieces 182*b* of the actuator 181 are inserted, and thereby rotatably supported.

The actuator 181, which is a member formed by processing, such as punching or bending, a conductive metal plate, has a shape like an elongated gutter with a U-shaped cross section, extending in the width direction of the second connector 101, and includes a flat strip-shaped bottom plate part 183 corresponding to the bottom of the gutter, and flat strip-shaped first side plate part 182 and second side plate part 184 corresponding to the side surfaces of the gutter. The first side plate part 182 and the second side plate part 184 are formed so as to extend from both side edges of the bottom plate part 183, are parallel to each other, and are orthogonal to the bottom plate part 183.

Further, the rotational pieces 182*b* that protrude outward are formed at the both ends of the first side plate part 182 in the width direction of the second connector 101. Further, protruding pieces 184*a* that protrude outward are formed at both ends of the second side plate part 184 in the width direction of the second connector 101. Further, the actuator 181 is rotatably attached to the second shell 171 by inserting the rotational pieces 182*b* into the rotational shaft support holes 173*a* formed in the side surface parts 173 of the second shell 171.

When the actuator 181 is attached to the second shell 171, the actuator 181 and the second shell 171 come into contact with each other. Thus, in the completed fitting shown in FIG. 1, the grounded line 92*g* of the wire 91 and the grounded terminal 61*g* also become equipotential to the actuator 181, in addition to the first upper shell 71, the first lower shell 72, and the second shell 171.

In addition, a lock protrusion 182*a* is formed at the center of the first side plate part 182 in the width direction of the second connector 101. The lock protrusion 182*a* is, in FIG. 4, a part obtained by bending an upper edge of the first side plate part 182 that coincides with a vertical surface and protruding the upper edge such that the distal end thereof is directed rearward and upward obliquely, and is a part that is brought into contact with the front surface part 713 of the first upper shell 71 of the first connector 10 when the actuator 181 is rotated after the first connector 10 is vertically fitted to the second connector 101, and engaged with the front surface lock recess 713*b* of the front surface part 713 and then locked when the front surface part 713 is pushed rearward to slide the first connector 10 horizontally with respect to the second connector 101 and then complete the fitting.

Furthermore, a protruded piece 183*a* for manipulation is formed at the center of the bottom plate part 183 in the width direction of the second connector 101. The protruded piece 183*a* for manipulation is a part formed by cutting and raising the vicinity of the connection of the second side plate part 184 to the bottom plate part 183 and protruded forward in FIG. 4, and is a part on which a finger or the like is hooked in the case where the operator manipulates the actuator 181 with the finger or the like.

Next, an operation for fitting the first connector 10 and second connector 101 that have the configurations described above will be described.

Figure 6A:
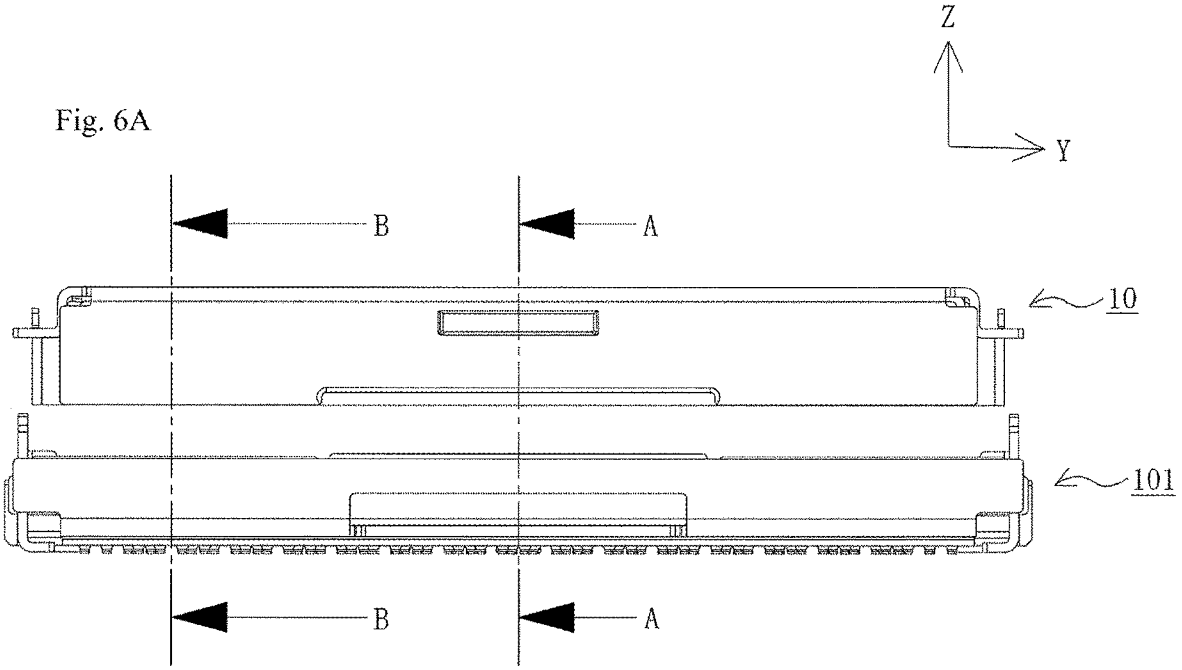
FIG. 6A illustrates a front view of the first connector and the second connector according to one embodiment immediately before fitting the connectors to each other.
Figure 6B:
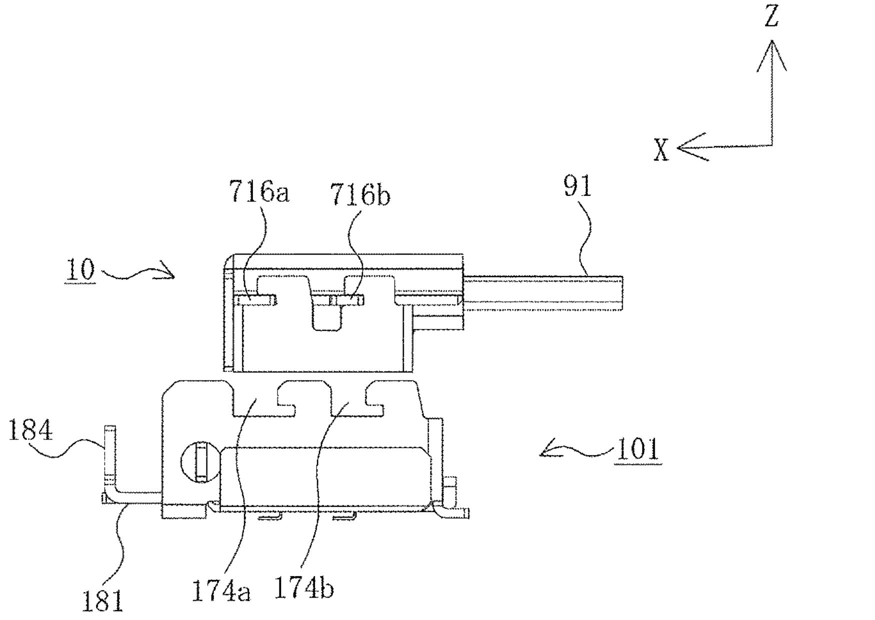
FIG. 6B illustrates a side view of the first connector and the second connector according to one embodiment immediately before fitting the connectors to each other.
Figure 7A:
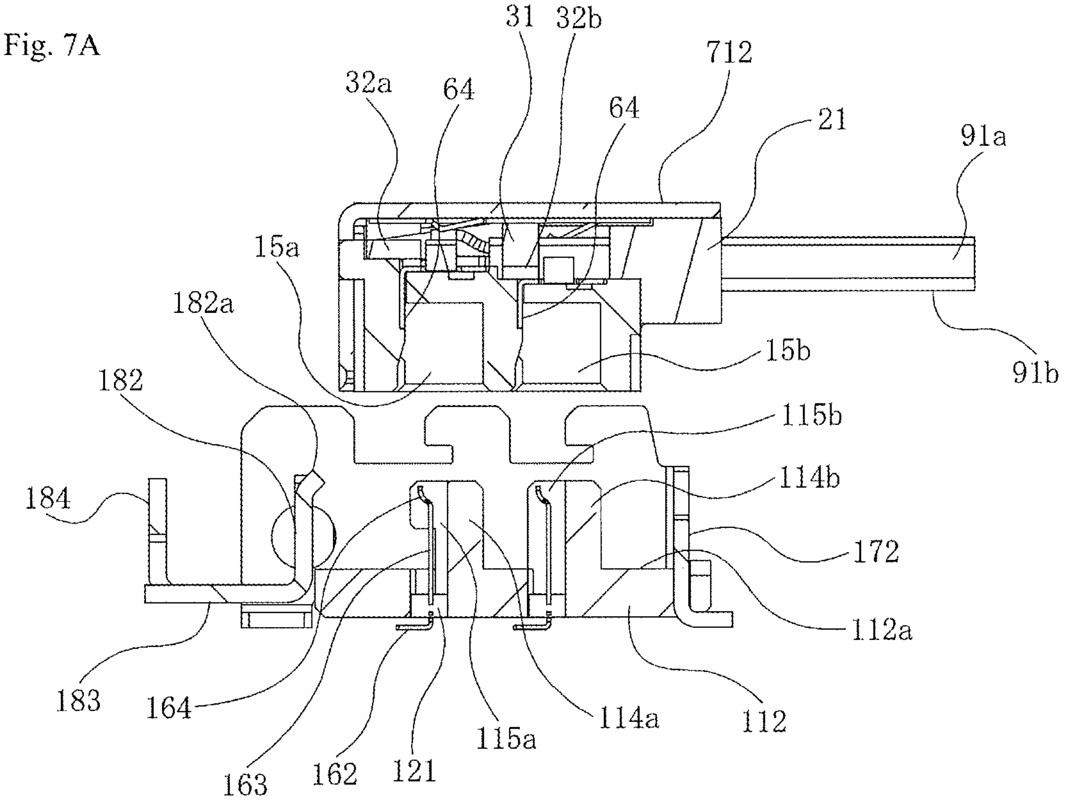
FIG. 7A illustrates a cross-sectional view taken along the line A-A of the first connector and the second connector according to one embodiment immediately before fitting the connectors to each other.
Figure 7B:
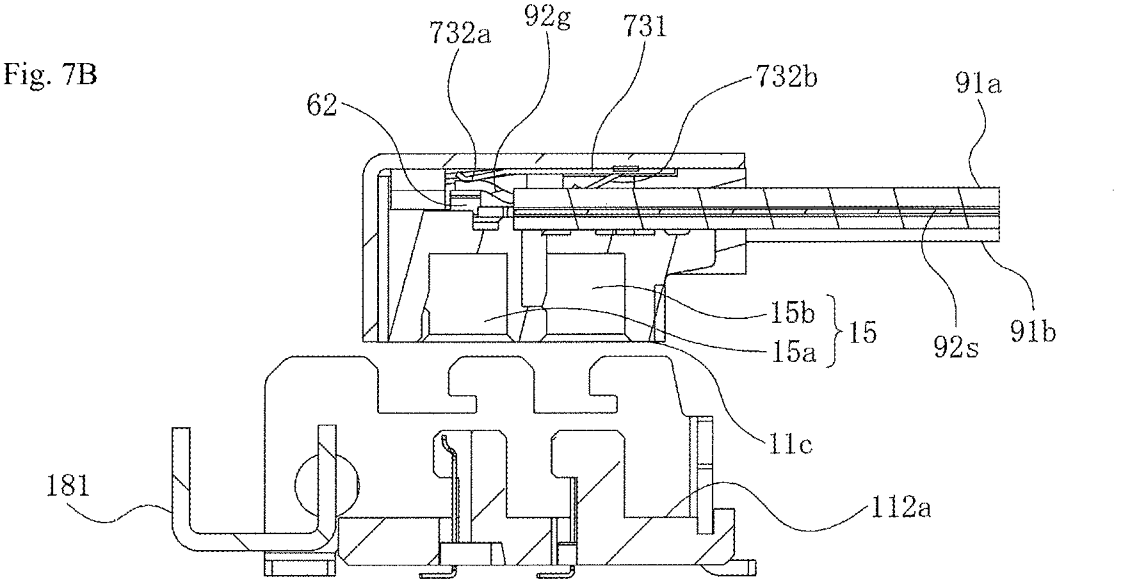
FIG. 7B illustrates a cross-sectional view taken along the line B-B of the first connector and the second connector according to one embodiment immediately before fitting the connectors to each other.
Figure 8A:
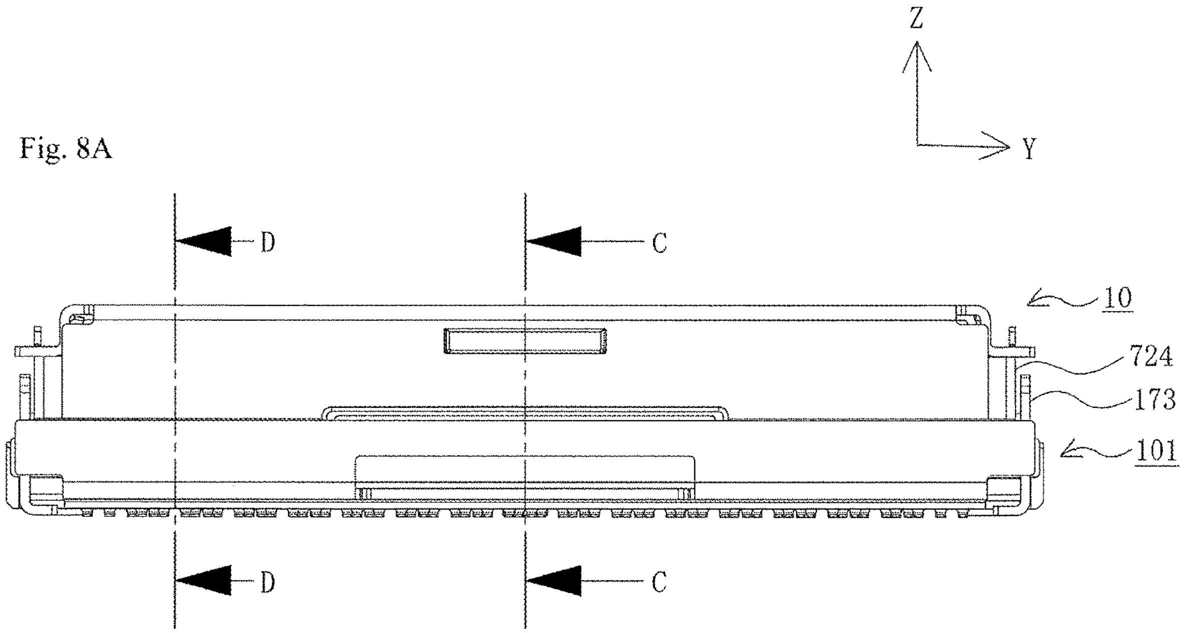
FIG. 8A illustrates a front view of the first connector and the second connector according to one embodiment in the middle of vertically fitting the connectors to each other.
Figure 8B:
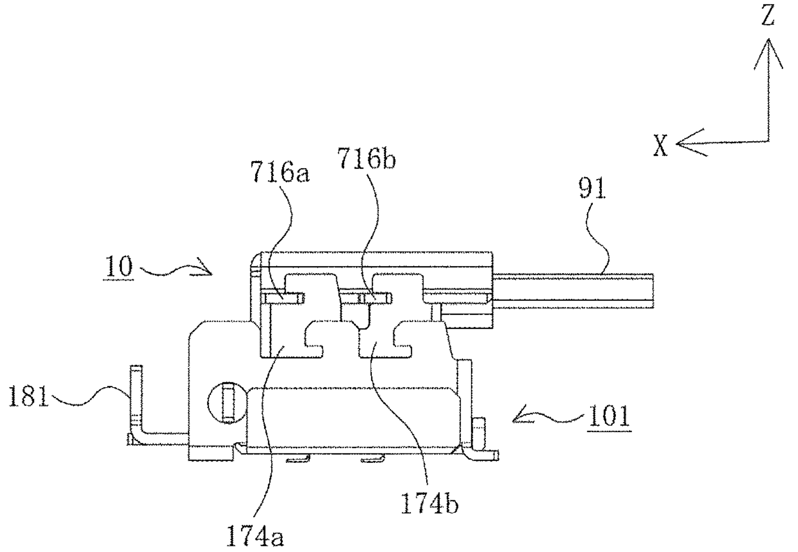
FIG. 8B illustrates a side view of the first connector and the second connector according to one embodiment in the middle of vertically fitting the connectors to each other.
Figure 9A:
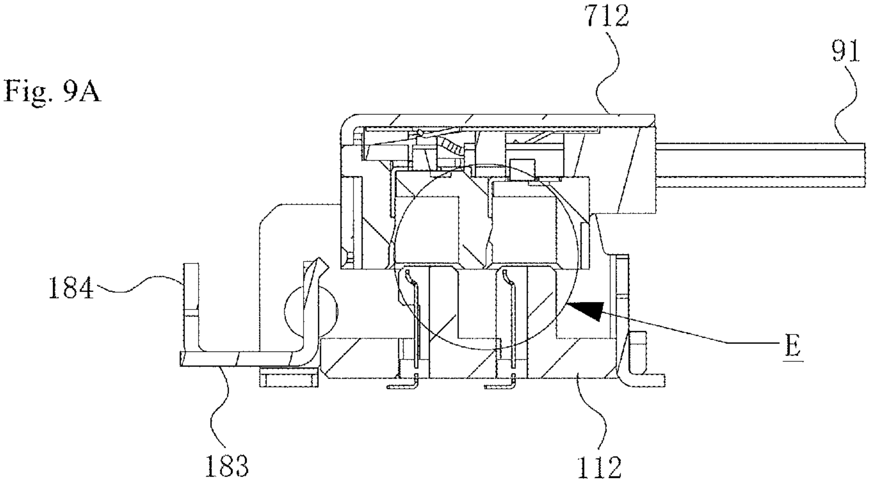
FIG. 9A illustrates a cross-sectional view taken along the line C-C in FIG. 8B of the first connector and the second connector according to one embodiment in the middle of vertically fitting the connectors to each other.
Figure 9B:
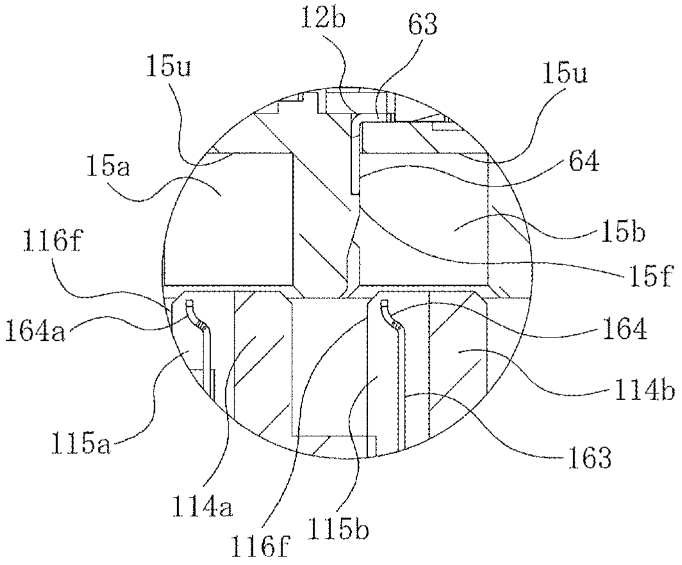
FIG. 9B illustrates an enlarged view of part E in FIG. 9A.
Figure 9C:
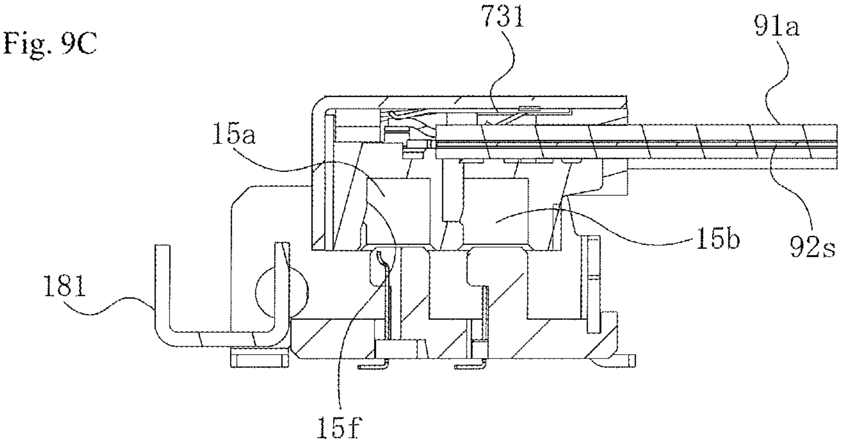
FIG. 9C illustrates a cross-sectional view taken along the line D-D of FIG. 8A.
Figure 10A:
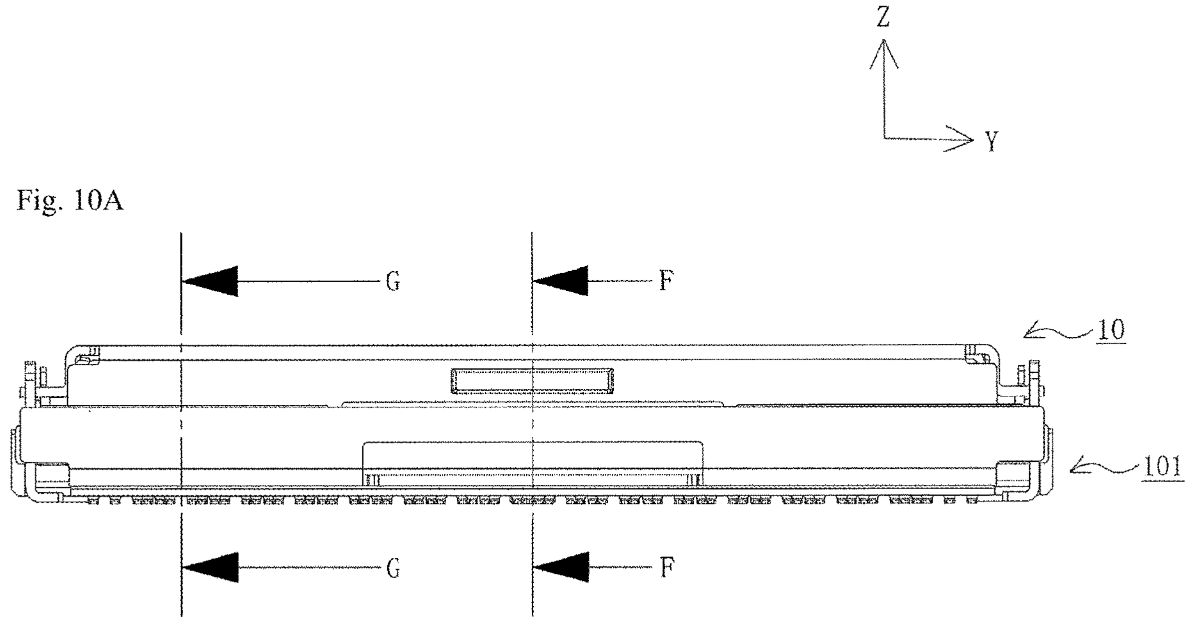
FIG. 10A illustrates the completion of vertically fitting the first connector and second connector according to one embodiment.
Figure 10B:
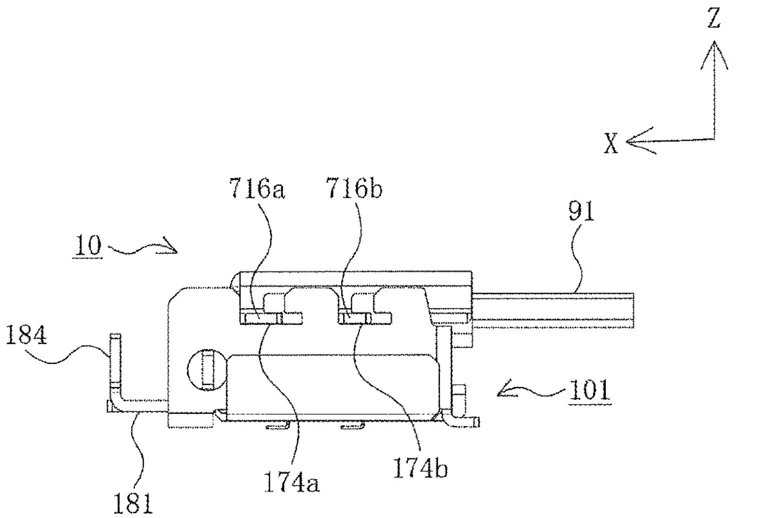
FIG. 10B illustrates a side view of the completion of vertically fitting the first connector and second connector according to one embodiment.
Figure 11A:
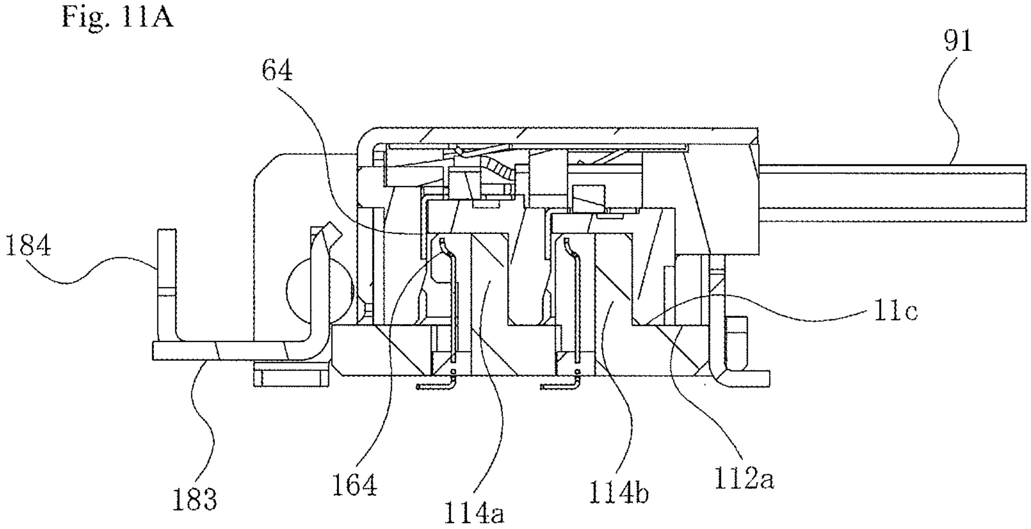
FIG. 11A illustrates a cross-sectional view taken along the line F-F in FIG. 10A of the completion of vertically fitting the first connector and second connector according to one embodiment.
Figure 11B:
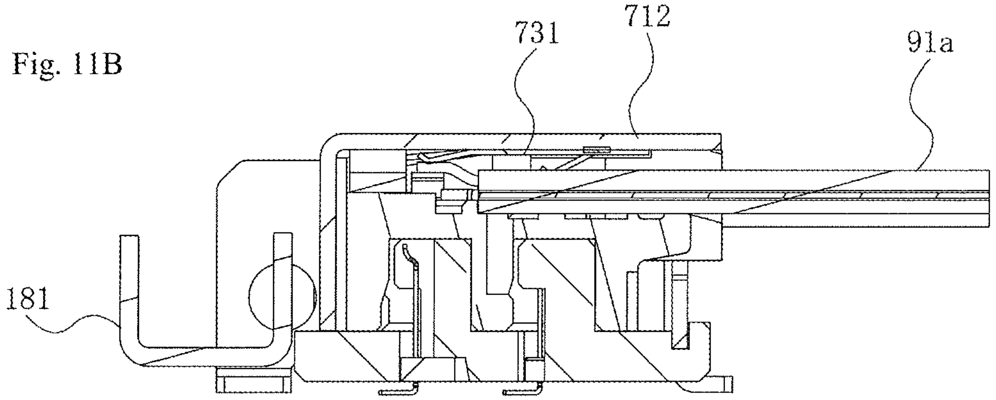
FIG. 11B illustrates a cross-sectional view taken along line G-G in FIG. 10A of the completion of vertically fitting the first connector and second connector according to one embodiment.
Figure 12A:
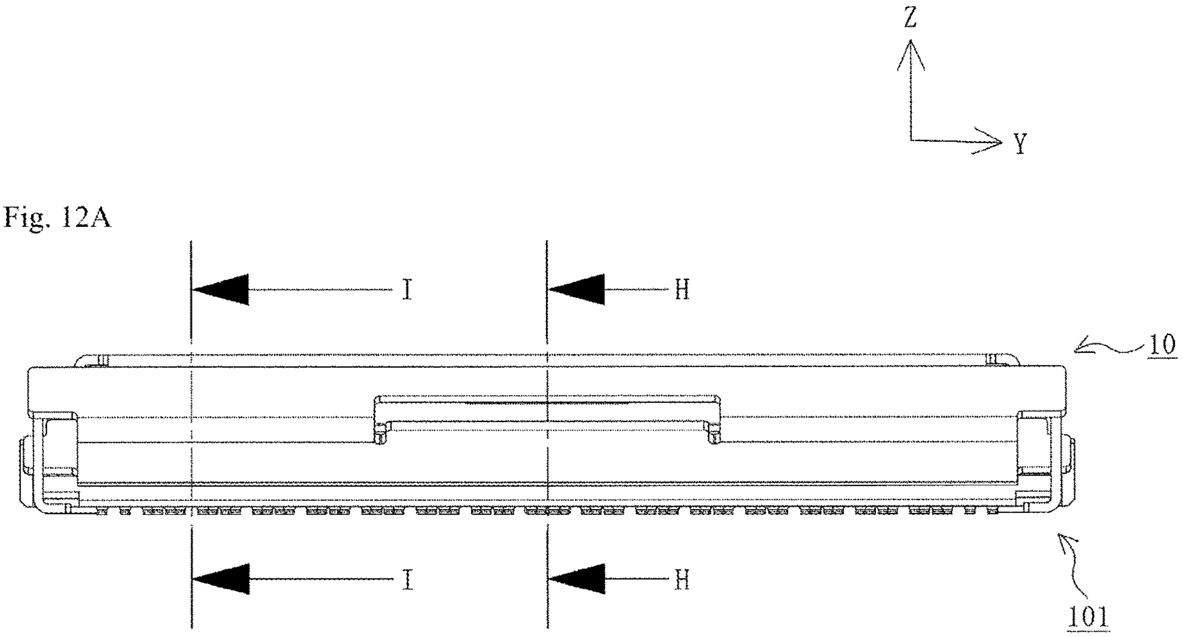
FIG. 12A illustrates a front view of the first connector and the second connector according to one embodiment in the middle of horizontally slide-fitting the connectors to each other.
Figure 12B:
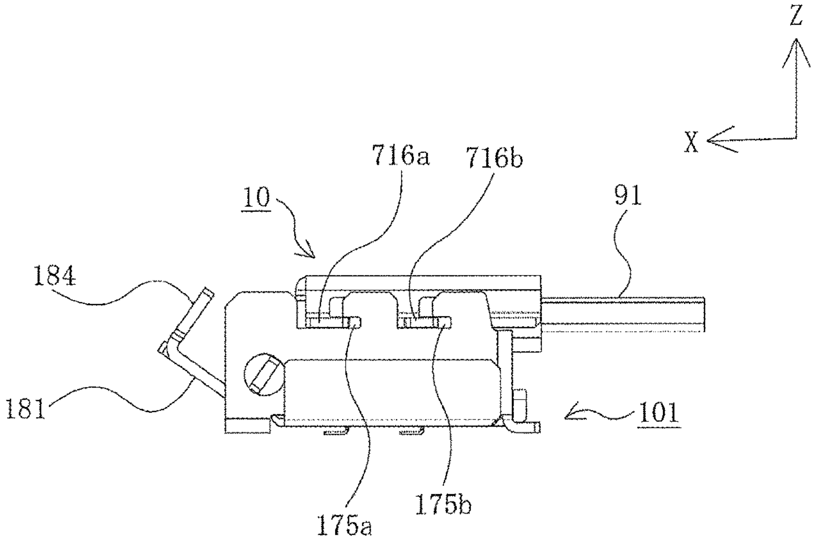
FIG. 12B illustrates a side view of the first connector and the second connector according to one embodiment in the middle of horizontally slide-fitting the connectors to each other.
Figure 13A:
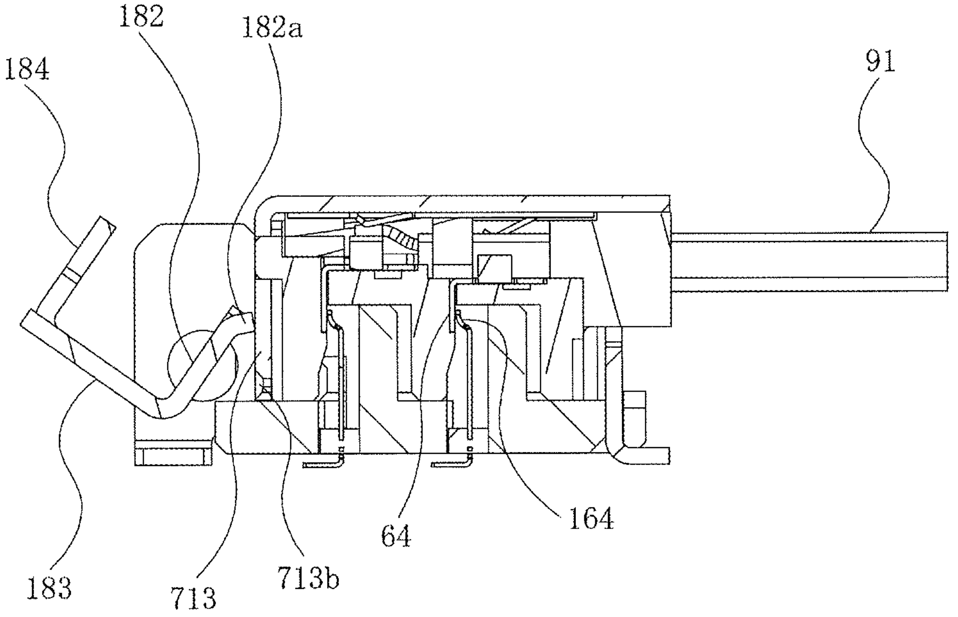
FIG. 13A illustrates a cross-sectional view taken along the line H-H in FIG. 12A of the first connector and the second connector according to one embodiment in the middle of horizontally slide-fitting the connectors to each other.
Figure 13B:
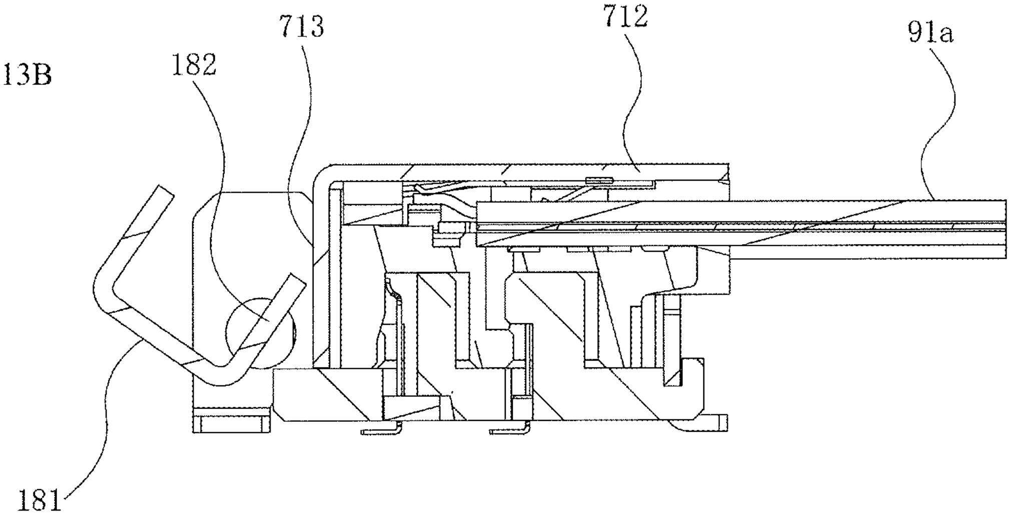
FIG. 13B illustrates a cross-sectional view taken along the line of I-I of FIG. 12A of the first connector and the second connector according to one embodiment in the middle of horizontally slide-fitting the connectors to each other.
Figure 14A:
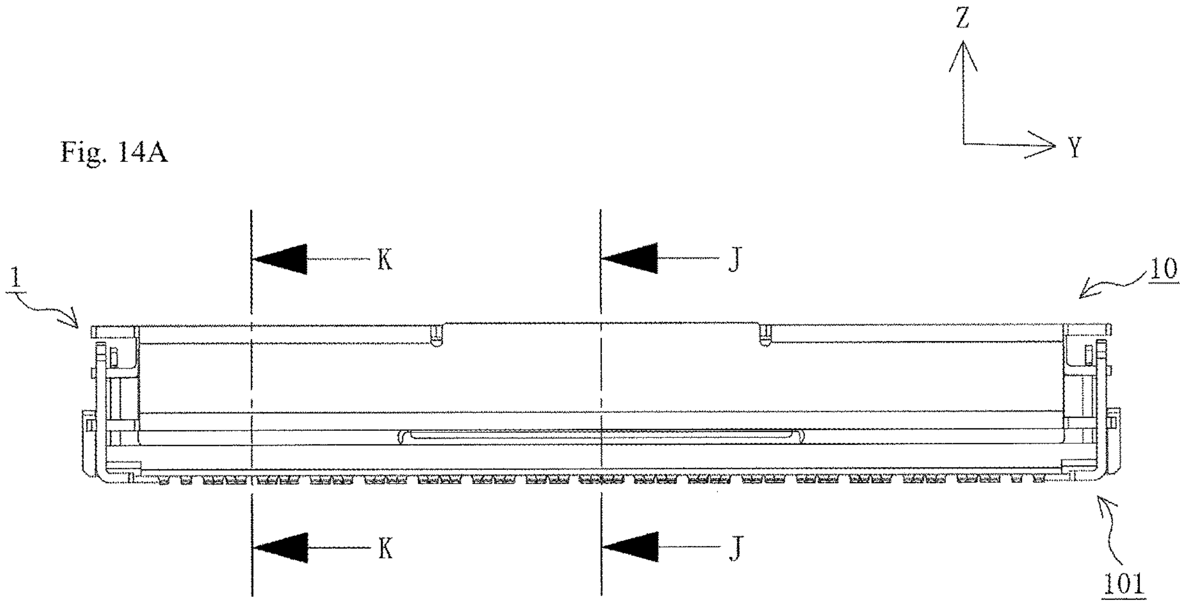
FIG. 14A illustrates a front view of the completion of horizontally slide-fitting the first connector and second connector according to one embodiment.
Figure 14B:
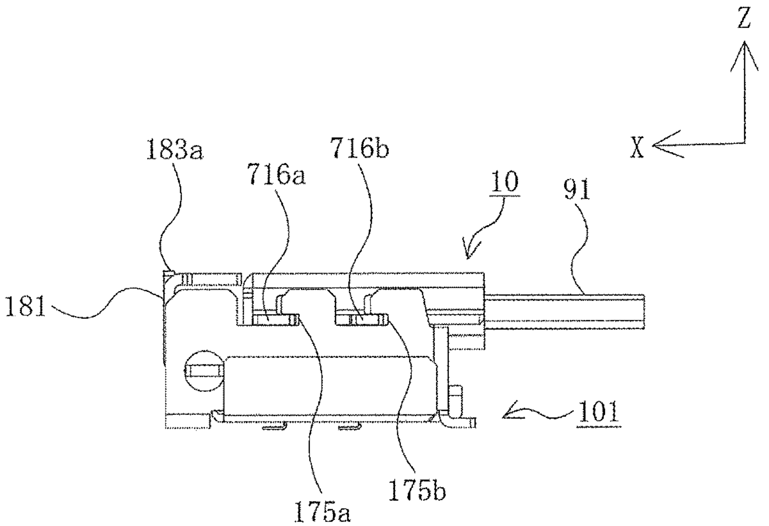
FIG. 14B illustrates a side view of the completion of horizontally slide-fitting the first connector and second connector according to one embodiment.
Figure 15A:
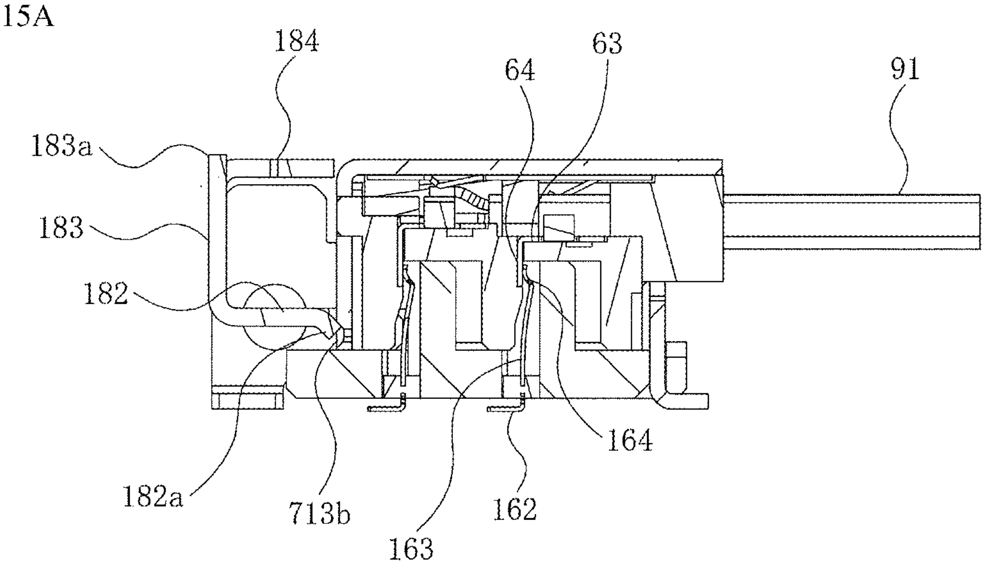
FIG. 15A illustrates a cross-sectional view taken along the line J-J in FIG. 14A of the completion of horizontally slide-fitting the first connector and second connector according to one embodiment.
Figure 15B:
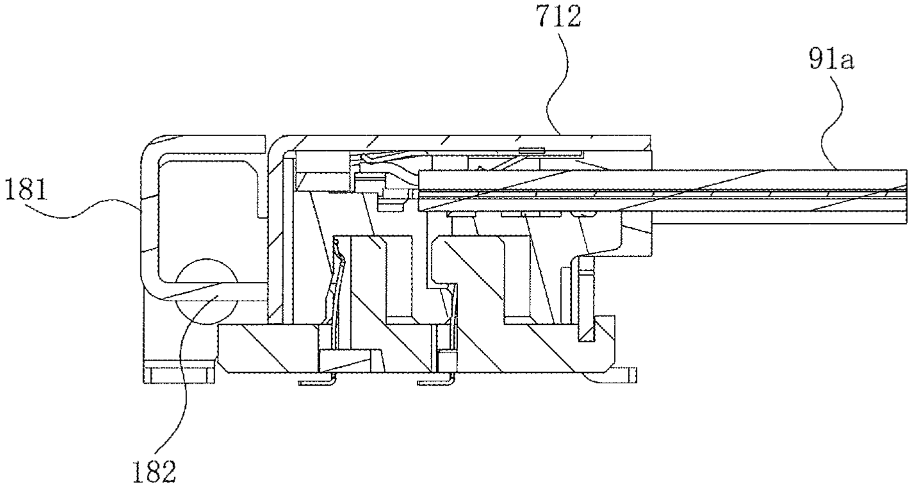
FIG. 15B illustrates a cross-sectional view taken along line K-K in FIG. 14A of the completion of horizontally slide-fitting the first connector and second connector according to one embodiment.

FIGS. 6A and 6B illustrate the first connector and the second connector according to the present embodiment immediately before fitting the connectors to each other, FIGS. 7*a* and 7*b* are cross-sectional views illustrating the first connector and the second connector according to the present embodiment immediately before fitting the connectors to each other, FIGS. 8*a* and 8*b* illustrate the first connector and the second connector according to the present embodiment in the middle of fitting the connectors to each other, FIGS. 9*a*, 9*b*, and 9*c* are cross-sectional views illustrating the first connector and the second connector according to the present embodiment in the middle of fitting the connectors to each other, FIGS. 10*a* and 10*b* illustrate the completion of vertically fitting the first connector and second connector according to the present embodiment, FIGS. 11*a* and 11*b* are cross-sectional views illustrating the completion of vertically fitting the first connector and second connector according to the present embodiment, FIGS. 12*a* and 12*b* illustrate the first connector and the second connector according to the present embodiment in the middle of horizontally slide-fitting the connectors, FIGS. 13*a* and 13*b* are cross-sectional views illustrating the first connector and the second connector according to the present embodiment in the middle of horizontally slide-fitting the connectors, FIGS. 14*a* and 14*b* illustrate the completion of horizontally slide-fitting the first connector and second connector according to the present embodiment, and FIGS. 15*a* and 15*b* are cross-sectional views illustrating the completion of horizontally slide-fitting the first connector and second connector according to the present embodiment. It is to be noted that, in FIGS. 6, 8, 10, 12, and 14, (a) is a front view, and (b) is a side view, in FIG. 7, (a) is a cross-sectional view taken along the line A-A in FIG. 6, and (b) is a cross-sectional view taken along the line B-B in FIG. 6, in FIG. 9, (a) is a cross-sectional view taken along the line C-C in FIG. 8, (b) is an enlarged view of a part E in FIG. 8(*a*), and (c) is a cross-sectional view taken along the line D-D in FIG. 8, in FIG. 11, (a) is a cross-sectional view taken along the line F-F in FIG. 10, and (b) is a cross-sectional view taken along the line G-G in FIG. 10, in FIG. 13, (a) is a cross-sectional view taken along the line H-H in FIG. 12, and (b) is a cross-sectional view taken along the line I-I in FIG. 12, and in FIG. 15, (a) is a cross-sectional view taken along the line J-J in FIG. 14, and (b) is a cross-sectional view taken along the line K-K in FIG. 14.

In this regard, the second connector 101 is assumed to be mounted on a surface of a circuit board, not shown. More specifically, the tail parts 162 of all of the board-side terminals 161 are assumed to be mechanically and electrically connected by a connecting means such as soldering to the respective conductive pads formed on the surface of the circuit board and connected to the conductive wires of the circuit board. In addition, the tail parts 171*a* of the second shell 171 are also assumed to be mechanically and electrically connected by a connecting means such as soldering to the conductive pads formed on the surface of the circuit board and connected to the grounded lines.

Further, in the case of fitting the first connector 10 to the second connector 101 surface-mounted on the circuit board, the operator manipulates the first connector 10 with a finger or the like to position the first connector 10 such that the lower surface 11*c* of the wire-side housing 11 faces the upper surface 112*a* of the bottom plate part 112 of the board-side housing 111, more specifically, as shown in FIGS. 6 and 7, the lower surface 11*c* of the wire-side housing 11 and the upper surface 112*a* of the bottom plate part 112 of the board-side housing III are parallel to each other, thereby causing the front locked pieces 716*a* and the rear locked pieces 716*b* on both sides in the width direction of the first connector 10 to face the front side surface engagement recesses 174*a* and the rear side surface engagement recesses 174*b* on both sides in the width direction of the second connector 101. Thus, the front fitting recess 15*a* and rear fitting recess 15*b* of the wire-side housing 11 will also face the front partition wall 114*a* and rear partition wall 114*b* of the board-side housing 111. It is to be noted that the actuator 181 of the second connector 101 desirably takes the “open” posture, that is, the posture where the second side plate part 184 substantially coincides with the vertical surface as shown in FIGS. 6 and 7.

Subsequently, the operator lowers the first connector 10 relatively with respect to the second connector 101 such that the position of the lower surface 11*c* of the wire-side housing 11 is substantially the same as the positions of the front partition wall 114*a* and rear partition wall 114*b* of the board-side housing 111 in the height direction as shown in FIGS. 8 and 9. Thus, as shown in FIG. 8, the side surface parts 724 on both sides in the width direction of the first lower shell 72 enter the inside of the side surface parts 173 of the second shell 171 on both sides in the width direction of the board-side housing 111. In addition, as shown in FIG. 9, the front partition wall 114*a* and front terminal housing section 115*a* and rear partition wall 114*b* and rear terminal housing section 115*b* of the board-side housing 111 are brought into a state immediately before the insertion into the front fitting recess 15*a* and rear fitting recess 15*b* that are open to the lower surface of the wire-side housing 11. It is to be noted that as shown in FIG. 9(*b*), the lower end and vicinity thereof of the contact part 64 of the wire-side terminal 61 inserted into the terminal housing groove 12 from above reach a part in the vicinity of the connection to the ceiling surface 15*u* at the front inner wall surface 15*f* of the fitting recess 15, and the surface of the contact part 64 facing the contact tip part 164 of the board-side terminal 161 is substantially flush with the front inner wall surface 15*f* of the fitting recess 15. In addition, the contact tip part 164 of the board-side terminal 161 is positioned behind the front end surface 116*f* of the partition rib 116 and behind the contact part 64 of the wire-side terminal 61.

Subsequently, when the operator further lowers the first connector 10 relatively with respect to the second connector 101, the vertical fitting is completed as shown in FIGS. 10 and 11. Then, the front locked piece 716*a* and rear locked piece 716*b* of the first connector 10 enter the front side surface engagement recess 174*a* and rear side surface engagement recess 174*b* of the second connector 101, and come into contact with or close to the bottoms of the front side surface engagement recess 174*a* and rear side surface engagement recess 174*b*.

Thus, as shown in FIG. 11, the front partition wall 114*a* and front terminal housing section 115*a* and rear partition wall 114*b* and rear terminal housing section 115*b* of the board-side housing 111 are inserted into and then housed in the front fitting recess 15*a* and rear fitting recess 15*b* of the wire-side housing 11. In this case, the upper end surfaces 114*u* of the front partition wall 114*a* and rear partition wall 114*b* of the board-side housing 111, which function as reference surfaces, and the ceiling surfaces 15*u* of the front fitting recess 15*a* and rear fitting recess 15*b* of the wire-side housing 11 are brought into contact with each other, and the positional relationship between the board-side housing 111 and the wire-side housing 11 and the positional relationship between the board-side terminal 161 and the wire-side terminal 61 corresponding to each other are thus defined in the vertical direction as determined in advance.

Further, the upper end of the contact tip part 164 of the board-side terminal 161 set to be lower than the upper end surface 114*u* of the partition wall 114 will not come into contact with the ceiling surface 15*u* of the fitting recess 15, and thus, the contact part 163 including the contact tip part 164 of the board-side terminal 161 will not receive any force from above, or will not be buckled or damaged. In addition, the contact tip part 164 of the board-side terminal 161 is positioned behind the front end surface 116*f* of the partition rib 116 and behind the contact part 64 of the wire-side terminal 61, thus not brought into contact with the contact part 64 of the wire-side terminal 61 also in the case where the partition wall 114 and terminal housing section 115 of the board-side housing 111 are inserted into the fitting recess 15 of the wire-side housing 11, and will not be thus buckled or damaged by receiving any force from the contact part 64.

Subsequently, the operator manipulates the actuator 181 of the second connector 101 to change the posture of the actuator 181 from the "open" posture as shown in FIGS. 10 and 11 to the "close" posture as shown in FIGS. 14 and 15, that is, the posture where the second side plate part 184 substantially coincides with the horizontal plane. Specifically, the actuator 181 is rotated in the clockwise direction in FIG. 10(*b*) about the rotational piece 182*b*. Then, the actuator 181 takes, as shown in FIGS. 12 and 13, a posture where the second side plate part 184 is inclined with respect to the vertical plane in the middle of the rotation. Then, the first side plate part 182 parallel to the second side plate part 184 is similarly inclined with respect to the vertical plane, and thus, as shown in FIG. 13(*a*), the end of the lock protrusion 182*a* formed at the first side plate part 182 will come into contact with the front surface part 713 of the first upper shell 71 of the first connector 10, and push the front surface part 713 rearward.

Accordingly, horizontal slide fitting is performed to move the first connector 10 rearward with respect to the second connector 101, and thus, as shown in FIG. 12(*b*), the front locked piece 716*a* and the rear locked piece 716*b* on both sides in the width direction of the first connector 10 move rearward, and then enter the front locking recess 175*a* formed in the front side surface engagement recess 174*a* and the rear locking recess 175*b* formed in the rear side surface engagement recess 174*b* on both sides in the width direction of the second connector 101, and the contact part 64 of the wire-side terminal 61 moves rearward and then comes into contact with the contact tip part 164 of the board-side terminal 161.

It is to be noted that the upper end surface 114*u* of the partition wall 114 of the board-side housing 111 and the ceiling surface 15*u* of the fitting recess 15 of the wire-side housing 11 come into contact with each other, and thus also functions as slide guiding surface in the case of the vertical slide fitting. In addition, the upper end surface 114*u* of the partition wall 114 of the board-side housing 111 is formed over substantially the entire range in the width direction (Y-axis direction) of the second connector 101, whereas the ceiling surface 15*u* of the fitting recess 15 of the wire-side housing 11 is formed over substantially the entire range in the width direction (Y-axis direction) of the first connector 10, and thus, the first connector 10 will not be inclined with respect to the second connector 101 as viewed from the front surface (as viewed in the X-axis direction). Accordingly, the first connector 10 can be reliably positioned with respect to the second connector 101 in the vertical direction (Z-axis direction), and then horizontally slide-fitted.

Then, when the operator continues to rotate the actuator 181 of the second connector 101, the first connector 10 further moves rearward with respect to the second connector 101, and when the rotation of the actuator 181 is completed, the horizontal slide fitting of the first connector 10 with respect to the second connector 101 is completed to complete the fitting between the first connector 10 and the second connector 101 as shown in FIGS. 14 and 15. Thus, the conductive wire 92 of the wire 91 and the conductive pad formed on the surface of the corresponding circuit board are electrically connected via the wire-side terminal 61 and the board-side terminal 161 in the wire-to-board connector 1. In this regard, the actuator 181 rotates in the clockwise direction in FIG. 15, with the end of the lock protrusion 182*a* formed at the first side plate part 182 in contact with the front surface part 713 of the first upper shell 71 of the first connector 10, and thus will act a downward force on the front surface part 713, and allow the first connector 10 to be kept from moving upward with respect to the second connector 101 in the middle of the horizontal slide fitting.

Then, the actuator 181 takes the "close" posture, and as shown in FIG. 15(*a*), the end of the lock protrusion 182*a* formed at the first side plate part 182 is engaged with and locked to the front surface lock recess 713*b* formed at the lower end of the front surface part 713 in the first upper shell 71 of the first connector 10. Accordingly, even if the first connector 10 or the second connector 101 receives an external force or an impact, the actuator 181 can maintain the "close" posture, and the fitting between the first connector 10 and the second connector 101 is prevented from being unnecessarily released. In addition, the locked piece 716 of the first upper shell 71 made of the metal plate enters the locking recess 175 of the second shell 171 made of the metal plate to be locked thereto, and the fitting between the first connector 10 and the second connector 101 is thus reliably prevented from being unnecessarily released. It is to be noted that, in the case where the operator hooks the finger or the like on the protruded piece 183*a* for manipulation and then rotates the actuator 181 in the counterclockwise direction in FIG. 15(*a*), the force exerted by the operator is sufficiently strong, the lock of the end of the lock protrusion 182*a* is thus released, and the actuator 181 can change the posture to take the "open" posture.

In addition, as shown in FIG. 15(*a*), the contact tip part 164 of the board-side terminal 161 is displaced rearward by the contact part 64 of the wire-side terminal 61, and the contact part 163 of the board-side terminal 161 with the lower end vicinity thereof held by the terminal holding member 121 functions as a cantilevered spring and undergoes elastic deformation. Accordingly, the contact tip part 164 of the board-side terminal 161 is pressed against the contact part 64 of the wire-side terminal 61 by the spring force exerted by the contact part 163, the condition of contact between the contact tip part 164 of the board-side terminal 161 and the contact part 64 of the wire-side terminal 61 is stably maintained, and the condition of conduction between the board-side terminal 161 and the wire-side terminal 61 is also stably maintained. Further, as described above, the contact surface 164*a* of the contact tip part 164 of the board-side terminal 161 has an arc shape expanded forward (in the positive X-axis direction), and the contact tip part 164 of the board-side terminal 161 and the contact part 64 of the wire-side terminal 61 are thus brought into point contact as viewed from the side surface (as viewed in the Y-axis direction). As described above, the board-side terminal 161 and the wire-side terminal 61 are electrically connected to each other by the stable point contact, and the impedance of the transmission path connecting the board-side terminal 161 and the wire-side terminal 61 is thus stably maintained.

It is to be noted that the locked piece 716 of the first upper shell 71 can come into contact with the rearmost part of the locking recess 175 of the second shell 171 to stop the horizontal slide of the first connector 10 with respect to the second connector 101, and the first connector 10 will thus not excessively move backward with respect to the second connector 101. Accordingly, the amount of rearward displacement of the contact tip part 164 of the board-side terminal 161 will not be excessively increased, and the amount of deformation of the contact part 163 will not be excessively increased.

Furthermore, as shown in FIG. 15(*a*), the contact point between the contact tip part 164 of the board-side terminal 161 and the contact part 64 of the wire-side terminal 61 is located in the vicinity of the lowermost end (most distal end) of the contact part 64 of the wire-side terminal 61, and the contact part 64 thus has almost no part that can serve as a stub. In addition, the contact tip part 164 of the board-side terminal 161 also has almost no part that can serve as a stub as described above. Accordingly, the stub formed in the transmission path connecting the board-side terminal 161 and the wire-side terminal 61 can be made as small as possible, thereby stabilizing the impedance of the conveyance path, and the transmission path is thus suitable for the transmission of high-speed signals.

Furthermore, as shown in FIG. 15(*a*), the transmission path connecting the main body part 63 of the wire-side terminal 61 with the conductive wire 92 of the wire 91 connected thereto and the tail part 162 of the board-side terminal 161 connected to the conductive pad formed on the surface of the circuit board is composed of the contact part 64 of the wire-side terminal 61 and the contact part 163 of the board-side terminal 161 extending straight in the vertical direction (perpendicular), and the contact tip part 164 that is extremely shorter than the contact part 163. More specifically, the transmission path in the wire-to-board connector 1, connecting the conductive wire 92 of the wire 91 and the conductive pad formed on the surface of the circuit board is substantially a vertically straight line. Accordingly, the transmission path is short in length and small in impedance, and thus suitable for the transmission of high-speed signals.

Furthermore, as shown in FIG. 15(*a*), the transmission path from the rear end (the end in the negative X-axis direction) of the main body part 63 of the wire-side terminal 61 to the tip (the end in the positive X-axis direction) of the tail part 162 of the board-side terminal 161 as viewed from the side surface (as viewed in the Y-axis direction) has a substantially crank shape, that is a shape that is bent, preferably at a right angle, and the main body part 63 and the tail part 162 have no overlap with each other in the vertical direction. More specifically, the transmission path from the rear end of the main body part 63 of the wire-side terminal 61 to the tip of the tail part 162 of the board-side terminal 161, connecting the wire-side terminal 61 and the board-side terminal 161, includes no overlapping part in the vertical direction. Accordingly, the transmission path will not degrade signal transmission characteristics.

Furthermore, when the fitting between the first connector 10 and the second connector 101 is attempted to reach the completion only by vertical fitting of merely lowering the low-profile first connector 10 with respect to the low-profile second connector 101, because of the short downward movement (stroke) of the first connector 10, the operator fails to reliably recognize the completion of the fitting, thereby resulting in incomplete fitting, and thus possibly in incomplete contact between the contact tip part 164 of the board-side terminal 161 and the contact part 64 of the wire-side terminal 61, but according to the present embodiment, the actuator 181 is adapted to be operated to perform the horizontal slide fitting after the vertical fitting, thus resulting in complete contact between the contact tip part 164 of the board-side terminal 161 and the contact part 64 of the wire-side terminal 61. In addition, the actuator 181 is locked to complete the horizontal slide fitting, and the operator can thus reliably recognize the completion of the fitting, without incomplete fitting. Furthermore, as described above, the contact part 64 of the wire-side terminal 61 is not brought into contact with the contact tip part 164 of the board-side terminal 161 while being relatively moved downward from above and then vertically slid with respect to the contact tip part 164, and there is thus no possibility that the contact part 163 including the contact tip part 164 of the board-side terminal 161 will be buckled, damaged, or the like.

In addition, even in the case where the first connector 10 moves forward with respect to the second connector 101 with the horizontal slide fitting of the first connector 10 being completed with respect to the second connector 101, the lock protrusion 182*a* formed at the first side plate part 182 of the actuator 181 is, as shown in FIG. 15(*a*), inclined such that the distal end thereof faces rearward and obliquely downward, and housed and engaged in the front surface lock recess 713*b* of the front surface part 713 in the first upper shell 71 of the first connector 10, and thus, when the first connector 10 moves forward (leftward in FIG. 15(*a*)), a downward force acts on the lock protrusion 182*a*, thereby allowing for preventing the rotation of the actuator 181 in the release direction (counterclockwise direction in FIG. 15(*a*)).

As described above, according to the present embodiment, the wire-to-board connector 1 includes: the first connector 10 including the wire-side housing 11, the wire 91 held by the wire-side housing 11, and the wire-side terminal 61 held by the wire-side housing 11, including the main body part 63 connected to the conductive wire 92 of the wire 91 and the contact part 64 extending in the vertical direction; and the second connector 101 including the board-side housing 111 and the board-side terminal 161 held by the board-side housing 111, including the contact part 163 extending in the vertical direction, which is mounted on the surface of the circuit board. Then, the first connector 10 is moved in the vertical direction with respect to the second connector 101 and then moved in the horizontal direction with respect to the second connector 101 to be fitted to the second connector 101, and when the first connector 10 is moved in the horizontal direction with respect to the second connector 101, the contact part 64 of the wire-side terminal 61 comes into contact with the contact part 163 of the board-side terminal 161.

Thus, the first connector 10 can reliably maintain the condition of the second connector 101 fitted thereto and the condition of the terminal in contact therewith. In addition, the connector is suitable for the transmission of high-speed signals, the structure can be simplified, the cost can be reduced, and the reliability is improved.

In addition, the contact part 64 of the wire-side terminal 61 and the contact part 163 of the board-side terminal 161 extend straight in the vertical direction. Furthermore, when the first connector 10 is moved in the direction perpendicular to the second connector 101, the contact part 64 of the wire-side terminal 61 and the contact part 163 of the board-side terminal 161 are not brought into contact with each other. Furthermore, the contact part 163 of the board-side terminal 161 includes the contact tip part 164 formed at the tip of the contact part 163, and the contact tip part 164 is curved so as to expand toward the contact part 64 of the wire-side terminal 61 and brought into contact with the vicinity of the most distal end of the contact part 64 of the wire-side terminal 61. Furthermore, the board-side terminal 161 includes the tail part 162 connected to the circuit board, the main body part 63 of the wire-side terminal 61 and the tail part 162 of the board-side terminal 161 extend in the second direction, and when the contact part 64 of the wire-side terminal 61 and the contact part 163 of the board-side terminal 161 come into contact with each other, the transmission path connecting the wire-side terminal 61 and the board-side terminal 161 take a substantially crank shape. Furthermore, the first connector 10 further includes the first shell 70 that covers at least a part of the periphery of the wire-side housing 11, the second connector 101 further includes the second shell 171 that covers at least a part of the periphery of the board-side housing 111, and the actuator 181 rotatably attached to the second shell 171, and when the actuator 181 is rotated, the first connector 10 is moved in the horizontal direction. Furthermore, the first shell 70 includes the front surface part 713 that covers at least a part of the front surface of the wire-side housing 11, the actuator 181 includes the lock protrusion 182*a*, and the lock protrusion 182*a* pushes the front surface part 713 to move the first connector 10 in the horizontal direction when the actuator 181 is rotated, and is engaged in and locked to the front surface lock recess 713*b* formed in the front surface part 713 when the rotation of the actuator 181 is completed.

It is to be noted that the disclosure of the present specification is intended to describe features related to preferred and exemplary embodiments. Various other embodiments, modifications, and variations within the scope and spirit of the claims appended hereto will be naturally conceived of by those skilled in the art upon reviewing the disclosure of the present specification.

The invention claimed is:

1. A connector assembly comprising:
- a first connector having a first housing, a wire held by the first housing, and a first terminal held by the first housing, wherein the first terminal includes a main body part connected to a conductive portion of the wire and a first contact part extending in a first direction; and
- a second connector having a second housing, a side surface part of the second housing, an engagement recess of the side surface part, and a second terminal held by the second housing,
- wherein the second terminal includes a second contact part extending in the first direction,
- wherein, to be fitted to the second connector, the first connector is moved into engagement with the engagement recess in the first direction with respect to the second connector, and then moved into a locking recess of the engagement recess in a second direction orthogonal to the first direction with respect to the second connector, and the first contact part is brought into contact with the second contact part when the first connector is moved in the second direction with respect to the second connector.

2. The connector assembly according to claim 1, wherein the first contact part and the second contact part extend straight in the first direction.

3. The connector assembly according to claim 1, wherein when the first connector is moved in the first direction with respect to the second connector, the first contact part and the second contact part are brought towards each other but are not brought into contact with each other.

4. The connector assembly according claim 1, wherein the second contact part comprises a contact tip part formed at a tip of the second contact part, and the contact tip part is curved to expand toward the first contact part, and wherein the contact tip part is movable to a vicinity of a most distal end of the first contact part.

5. The connector assembly according to claim 1, wherein the second terminal comprises a tail part connected to a circuit board, the main body part of the first terminal and the tail part of the second terminal extend in the second direction, and when the first contact part and the second contact part come into contact with each other, a transmission path having a bent shape is formed connecting the first terminal and the second terminal.

6. A connector assembly comprising:
- a first connector having a first housing, a wire held by the first housing, and a first terminal held by the first housing, wherein the first terminal includes a main body part connected to a conductive portion of the wire and a first contact part extending in a first direction; and
- a second connector having a second housing, and a second terminal held by the second housing, wherein the second terminal includes a second contact part extending in the first direction, wherein:

the first connector is moved in the first direction with respect to the second connector, and then moved in a second direction orthogonal to the first direction with respect to the second connector to be fitted to the second connector, and the first contact part is brought into contact with the second contact part when the first connector is moved in the second direction with respect to the second connector, and the first connector further comprises a first shell that covers at least a part of a periphery of the first housing, the second connector further comprises a second shell that covers at least a part of a periphery of the second housing, and the connector assembly further comprises an actuator that is rotatably attached to the second shell, wherein when the first connector is engaged with the second connector and the actuator is rotated, the first connector is moved in the second direction.

7. The connector assembly according to claim 6, wherein the first shell comprises a front surface part that covers at least a part of a front surface of the first housing, the actuator comprises a lock protrusion, and the lock protrusion pushes the front surface part to move the first connector in the second direction when the actuator is rotated, and is engaged in and locked to a front surface lock recess formed in the front surface part when the rotation of the actuator is completed.

8. The connector assembly according to claim 6, wherein the first shell includes a locked piece which slidably engages a side surface engagement recess formed in the second shell, wherein the locked piece is cable of locking the first shell with the second shell, wherein the locked piece is inserted into the side surface engagement recess and the first connector is moved in the second direction.

9. The connector assembly according to claim 1, wherein the first connector is a wire connector and the second connector is a board connector mounted on a circuit board.

10. A connector assembly comprising:

a first connector having a first housing, a wire held by the first housing, and a first terminal held by the first housing, wherein the first terminal includes a main body part connected to a conductive portion of the wire and a first contact part extending in a first direction; and a second connector having a second housing, a side surface part of the second housing, an engagement recess of the side surface part, and a second terminal held by the second housing, wherein the second terminal includes a second contact part extending in the first direction, wherein the first connector forms a fitting recess and the second connector includes a partition wall which mates with the fitting recess, wherein the partition wall is movable in the first direction and in a second direction orthogonal to the first direction within the fitting recess to bring the first contact part into contact with the second contact part, and wherein, to be fitted to the second connector, the first connector is moved into engagement with the engagement recess in the first direction with respect to the second connector, and then moved into a locking recess of the engagement recess in the second direction with respect to the second connector.

11. The connector assembly according to claim 10, wherein the first contact part and the second contact part extend in the first direction.

12. The connector assembly according to claim 10, wherein when the first connector is moved in the first direction with respect to the second connector, the first contact part and the second contact part are brought towards each other but are not brought into contact with each other.

13. The connector assembly according claim 10, wherein the second contact part comprises a contact tip part formed at a tip of the second contact part, and the contact tip part is curved to expand toward the first contact part, and wherein the contact tip part is movable to a vicinity of a most distal end of the first contact part.

14. The connector assembly according to claim 10, wherein the second terminal comprises a tail part connected to a circuit board, the main body part of the first terminal and the tail part of the second terminal extend in the second direction, and when the first contact part and the second contact part come into contact with each other, a transmission path having a bent shape is formed connecting the first terminal and the second terminal.

15. A connector assembly comprising:

a first connector having a first housing, a wire held by the first housing, and a first terminal held by the first housing, wherein the first terminal includes a main body part connected to a conductive portion of the wire and a first contact part extending in a first direction; and a second connector having a second housing, and a second terminal held by the second housing, wherein the second terminal includes a second contact part extending in the first direction, wherein:

the first connector forms a fitting recess and the second connector includes a partition wall which mates with the fitting recess, wherein the partition wall is movable in the first direction within the fitting recess in order to move the second contact part in the first direction towards the first contact part and engage the first connector with the second connector, and wherein the partition wall is movable in a second direction orthogonal to the first direction within the fitting recess in order to move the second contact part in the second direction towards the first contact part to bring the first contact part into contact with the second contact part, and the first connector further comprises a first shell that covers at least a part of a periphery of the first housing, the second connector further comprises a second shell that covers at least a part of a periphery of the second housing, and the connector assembly further comprises an actuator that is rotatably attached to the second shell, wherein when the first connector is engaged with the second connector and the actuator is rotated, the first connector is moved in the second direction.

16. The connector assembly according to claim 15, wherein the first shell comprises a front surface part that covers at least a part of a front surface of the first housing, the actuator comprises a lock protrusion, and the lock protrusion pushes the front surface part to move the first connector in the second direction when the actuator is rotated, and is engaged in and locked to a front surface lock recess formed in the front surface part when the rotation of the actuator is completed.

17. The connector assembly according to claim 15, wherein the first shell includes a locked piece which slidably engages a side surface engagement recess formed in the second shell, wherein the locked piece is cable of locking the first shell with the second shell when the locked piece is inserted into the side surface engagement recess and the first connector is moved in the second direction.

18. The connector assembly according to claim 10, wherein the first connector is a wire connector and the second connector is a board connector mounted on a circuit board.

* * * * *